US010223947B2

(12) United States Patent
Butler, III

(10) Patent No.: US 10,223,947 B2
(45) Date of Patent: Mar. 5, 2019

(54) FLAG MOUNT BRACKET SYSTEMS

(71) Applicant: GB3 Design, Mesa, AZ (US)

(72) Inventor: George H. Butler, III, Mesa, AZ (US)

(73) Assignee: GB3 Design, Mesa, AZ (US)

( * ) Notice: Subject to any disclaimer, the term of this patent is extended or adjusted under 35 U.S.C. 154(b) by 0 days.

(21) Appl. No.: 15/334,996

(22) Filed: Oct. 26, 2016

(65) Prior Publication Data

US 2017/0053573 A1 Feb. 23, 2017

Related U.S. Application Data

(63) Continuation-in-part of application No. 14/989,786, filed on Jan. 6, 2016, now Pat. No. 10,056,017.

(60) Provisional application No. 62/100,399, filed on Jan. 6, 2015.

(51) Int. Cl.
*G09F 17/00* (2006.01)
*B25J 1/04* (2006.01)

(52) U.S. Cl.
CPC ................ *G09F 17/00* (2013.01); *B25J 1/04* (2013.01); *G09F 2017/0008* (2013.01); *G09F 2017/0025* (2013.01)

(58) Field of Classification Search
CPC ............. G09F 17/00; G09F 2017/0025; G09F 2017/005; G09F 2017/0058; G09F 2017/0066; G09F 2017/0075
USPC ......... 248/514, 518, 521, 534; 116/173, 116
See application file for complete search history.

(56) References Cited

U.S. PATENT DOCUMENTS

| 1,203,937 | A | * | 11/1916 | Surface | A01K 97/10 248/230.1 |
| 1,339,833 | A | * | 5/1920 | Saltmarsh | E04H 12/32 116/173 |
| 1,665,535 | A | | 11/1927 | Davis | |
| 1,742,481 | A | | 1/1930 | Miller | |
| 3,792,680 | A | | 2/1974 | Allen | |
| 3,996,882 | A | | 12/1976 | Martin et al. | |
| 4,554,885 | A | | 11/1985 | Burny, Jr. | |
| 4,864,962 | A | | 9/1989 | Kuehl et al. | |
| 4,917,343 | A | * | 4/1990 | Wainscott | A47B 23/06 248/284.1 |
| 5,042,418 | A | * | 8/1991 | Hoover | B60R 13/005 116/173 |
| D340,676 | S | * | 10/1993 | Gallagher | G09F 7/18 D11/181 |
| 5,374,024 | A | * | 12/1994 | Williams | G09F 7/18 116/173 |
| 5,572,836 | A | | 11/1996 | Parker | |
| 5,588,630 | A | * | 12/1996 | Chen-Chao | F16C 11/10 248/514 |
| 5,628,538 | A | * | 5/1997 | Ericksen | A01K 97/24 294/210 |
| 6,050,020 | A | * | 4/2000 | Sizemore | A01K 97/11 43/15 |
| 6,138,978 | A | | 10/2000 | Andersen | |
| 6,450,557 | B1 | * | 9/2002 | Martinez | A47F 13/06 294/210 |
| 6,799,530 | B1 | | 10/2004 | Heichelbech | |

(Continued)

*Primary Examiner* — Muhammad Ijaz
(74) *Attorney, Agent, or Firm* — Lodestar Patents, PLLC; Raymond J. E. Hall

(57) ABSTRACT

Flag mount bracket system for improved installation of a flag into a bracket safely from ground level without the need for a ladder comprising a spring tension mount or ratchet mount and a specialized raising and lowering pole.

20 Claims, 17 Drawing Sheets

(56) References Cited

U.S. PATENT DOCUMENTS

| | | | | |
|---|---|---|---|---|
| 6,988,701 B1* | 1/2006 | Lin | ................. | F16C 11/10 |
| | | | | 248/514 |
| 7,007,906 B2* | 3/2006 | Slatter | ................. | A01K 91/08 |
| | | | | 114/255 |
| 7,114,281 B2* | 10/2006 | Miller | ................. | A01K 97/10 |
| | | | | 43/21.2 |
| 7,264,218 B1* | 9/2007 | Edwards | ................. | F16M 11/16 |
| | | | | 135/16 |
| 9,326,496 B2* | 5/2016 | Chmura | ................. | A01K 97/10 |
| 2001/0050327 A1* | 12/2001 | Sweere | ................. | F16C 11/045 |
| | | | | 248/292.14 |
| 2006/0102822 A1* | 5/2006 | Liang | ................. | F16C 11/10 |
| | | | | 248/514 |
| 2006/0102824 A1* | 5/2006 | Carnevali | ................. | F16C 11/10 |
| | | | | 248/534 |
| 2006/0130381 A1 | 6/2006 | Caterinacci | | |
| 2011/0185960 A1* | 8/2011 | Priegel | ................. | G09F 17/00 |
| | | | | 116/173 |
| 2013/0061797 A1* | 3/2013 | Proctor | ................. | G09F 17/00 |
| | | | | 116/173 |

* cited by examiner

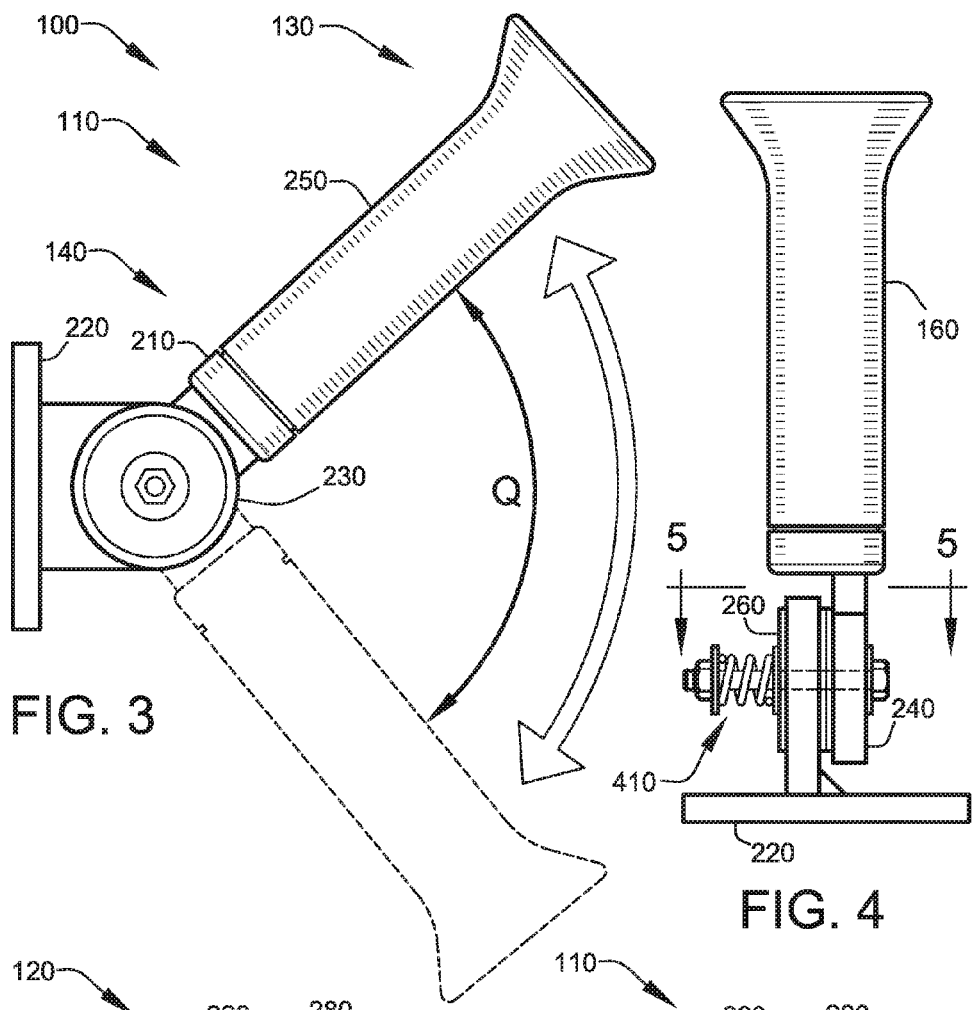
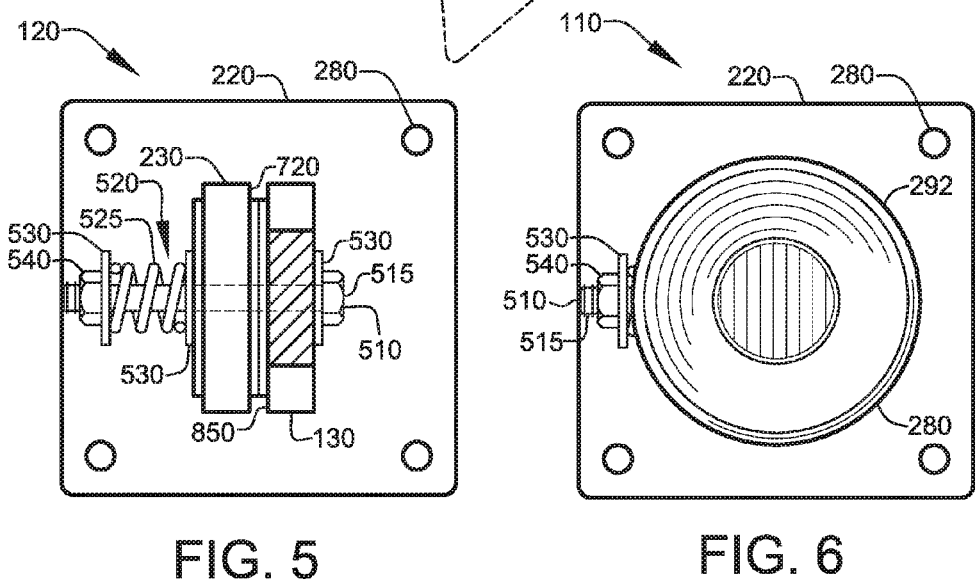

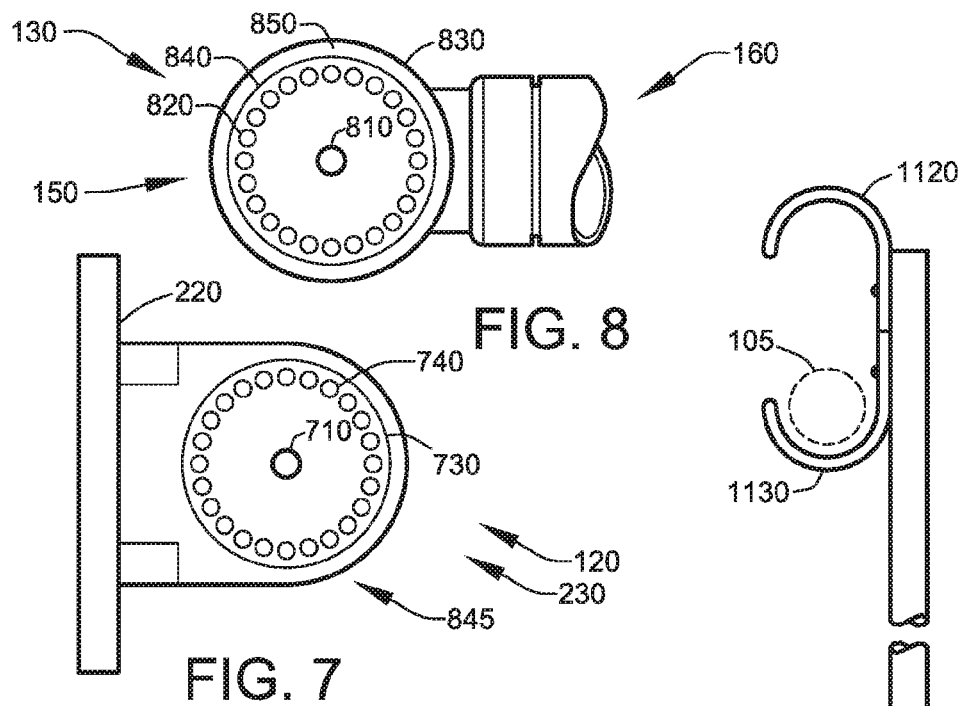
FIG. 8
FIG. 7
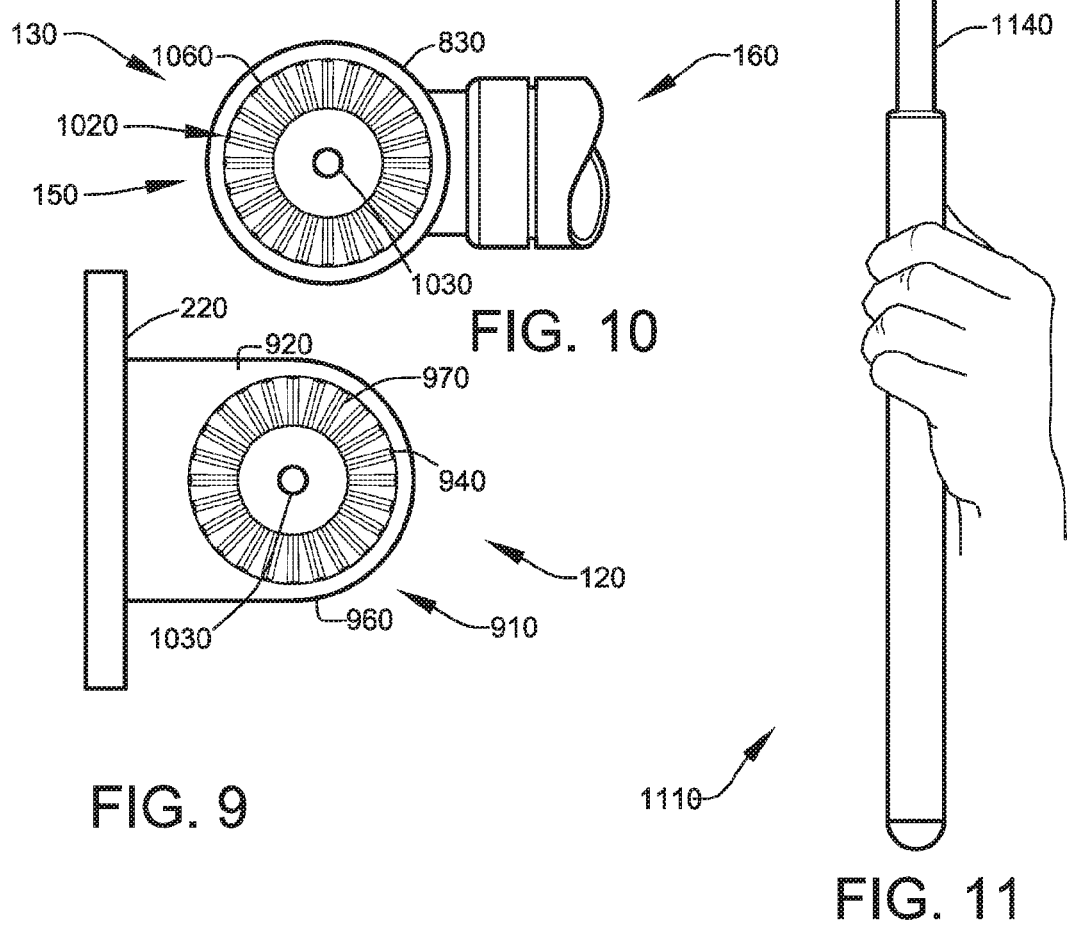
FIG. 10
FIG. 9
FIG. 11

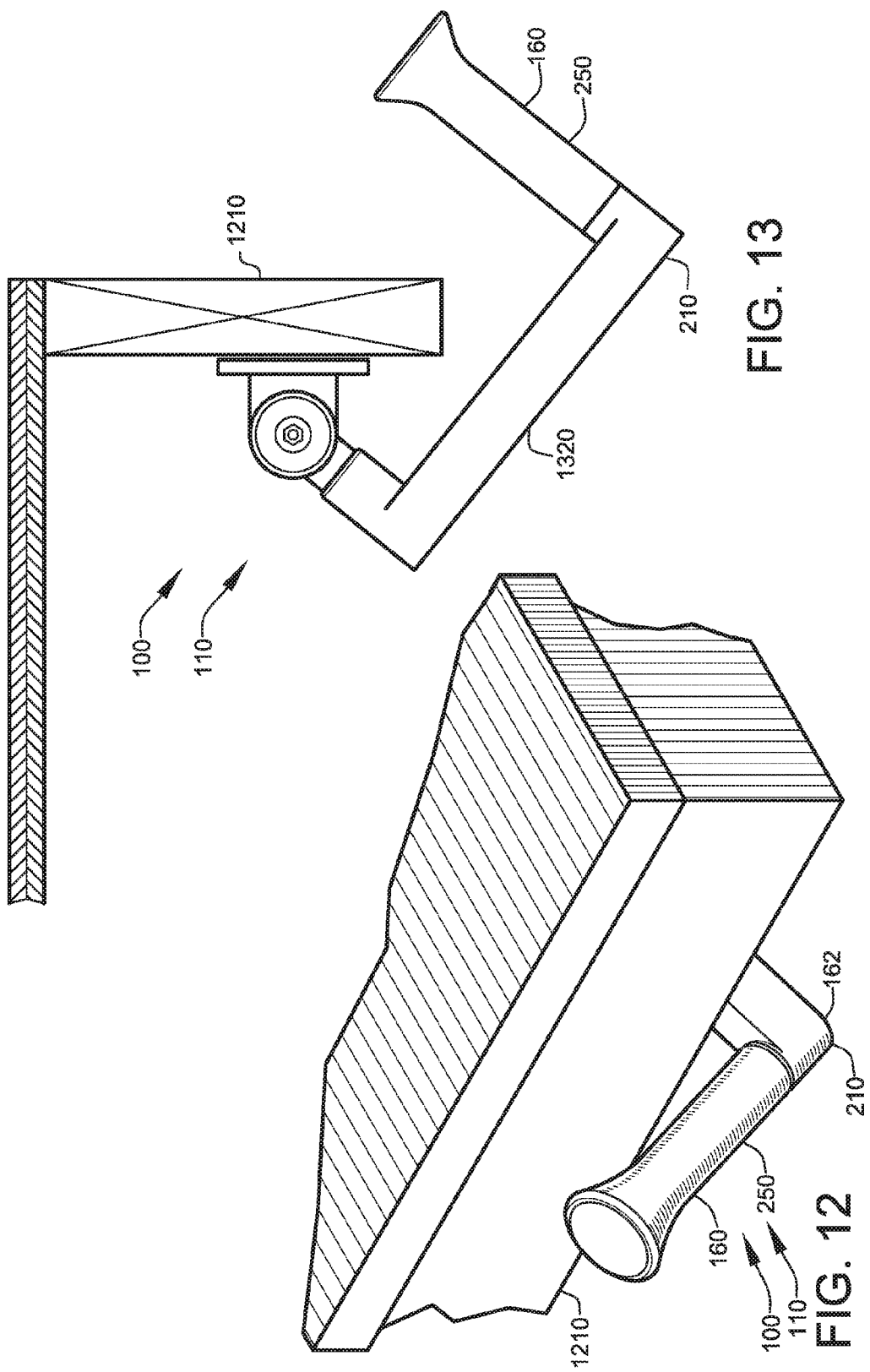

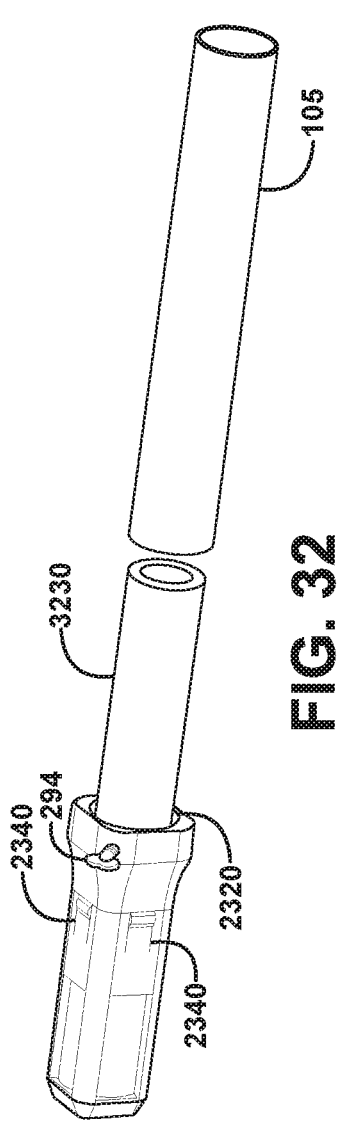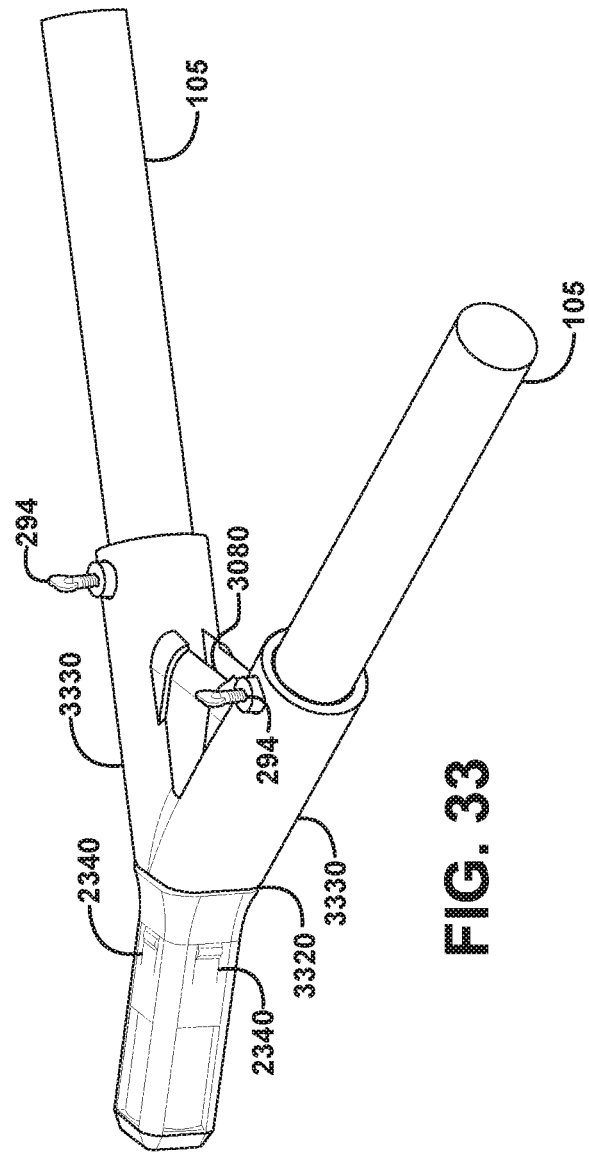

FLAG MOUNT BRACKET SYSTEMS

CROSS-REFERENCE TO RELATED APPLICATION

The present application is a continuation-in-part and is related to and claims priority from application Ser. No. 14/989,786, filed Jan. 6, 2016, entitled FLAG MOUNT BRACKET SYSTEMS, and which application is related to and claims priority from prior provisional application Ser. No. 62/100,399, filed Jan. 6, 2015, entitled "FLAG MOUNT BRACKET SYSTEMS", the contents of which are incorporated herein by this reference and is not admitted to be prior art with respect to the present invention by the mention in this cross-reference section.

BACKGROUND

Many people have a flag bracket attached to the eaves of their home in order to fly a national flag on appropriate holidays, to fly a flag commemorating various holidays, to fly a state flag, or simply to fly a decorative flag.

The present invention relates to providing a system for improved installation of a flag into a bracket and raising it to the desired height and angle of flying from ground level without the need for a ladder. More particularly this invention relates to providing a system for placing a flag into a bracket, securing the flagpole in the bracket, and raising the flag to the desired height and angle of flying from ground level without the need to climb a ladder. Moreover, the present invention provides a feature which will prevent the flag from wrapping around the pole on a windy day, allowing the flag to always be visible while flying. Additionally, the present invention provides a system for doing all of the above with a bracket that is hidden on the underside of the eaves of the roof so that the bracket, when not in use, cannot be easily seen.

OBJECTS AND FEATURES OF THE INVENTION

A primary object and feature of the present invention is to provide a system overcoming the above-mentioned problem.

A further primary object and feature of the present invention is to provide a system that allows a user to place a flag in a bracket and raise it to a desired height and angle without the need to use a ladder.

A further primary object and feature of the present invention is to provide such a system that allows a user to safely place a flag in a bracket from the ground, and with the assistance of a specially designed pole, raise the flag to the desired height and angle and secure it at that height and angle.

A further primary object and feature of the present invention is to provide such a system that allows for a flag to be locked in place such that it will not come down unless the specially designed pole is used to disengage the lock on the bracket.

Yet another primary object and feature of the present invention is to provide such a system that allows for a flag to be lowered slowly and safely after disengaging the bracket lock with the specially designed pole.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a flag mount system, relating to a user's capability to post and retrieve at least one flag at a height greater than the hand-reach of the user while standing upon the ground, comprising: at least one flag-pole receiver structured and arranged to receive posting of the at least one flag on at least one flag pole; at least one surface mount structured and arranged to mount on at least one substantially vertical surface at a height greater than the hand-reach of the user; at least one flag-pole retainer structured and arranged to retain at least one end of such at least one flag pole in such at least one flag-pole receiver until the user retrieves the at least one flag; at least one connector structured and arranged to connect such at least one flag-pole receiver and such at least one surface mount; wherein such at least one connector comprises at least one rotation permitter structured and arranged to permit rotation of such at least one flag-pole receiver of at least 90 degrees; wherein such rotation comprises a full-mast raised position of the at least one flag, a half-mast raised position of the at least one flag, and a lowered position of the at least one flag; wherein after posting the at least one flag, upward movement of such at least one flag pole by the user rotates such at least one flag-pole receiver toward at least one raised position of such full-mast raised position and such half-mast raised position; wherein such at least one rotation permitter comprises at least one position maintainer structured and arranged to maintain such at least one raised position until released, and at least one position releaser structured and arranged to release such at least one raised position and permitting lowering of such at least one flag-pole receiver to such lowered position, wherein such at least one position maintainer and such at least one position releaser are activated through manipulation of such at least one flag pole by the user while the user is standing on the ground; wherein, when such at least one surface mount is at a height greater than the hand-reach of the user, such at least one flag-pole receiver requires such lowered position to post and retrieve the at least one flag; wherein such at least one surface mount is now mountable at a height greater than the hand-reach of the user while the user is still able to post, raise, lower and retrieve the flag while standing on the ground. Moreover, it provides such a flag mount system further comprising at least one flag-pole manipulator structured and arranged to permit user-manipulation of such at least one flag pole when such at least one flag pole is out of the hand-reach of the user while the user is standing on the ground.

Additionally, it provides such a flag mount system further comprising at least one flag-pole axial twister structured and arranged to axial twist such at least one flag pole preventing the at least one flag from wrapping around such at least one flag pole. Also, it provides such a flag mount system further comprising at least one eaves-retractor structured and arranged to retract such at least one flag-pole receiver under at least one roof eaves when in such lowered position. In addition, it provides such a flag mount system wherein such at least one flag-pole retainer comprises at least one friction-fit retainer structured and arranged to retain such at least one flag pole in such at least one flag-pole receiver through friction. And, it provides such a flag mount system wherein such at least one friction-fit retainer mounts to such at least one flag pole.

Further, it provides such a flag mount system wherein such at least one flag-pole receiver further comprises at least one pole-end guide structured and arranged to guide such at least one end of such at least one flag-pole into alignment with such at least one flag-pole receiver. Even further, it provides such a flag mount system wherein such at least one pole-end guide comprises a funnel-shaped structure. Moreover, it provides such a flag mount system wherein such at least one position maintainer maintains positions at about 15 degree intervals.

In accordance with another preferred embodiment hereof, this invention provides a flag mount system, relating to a user's capability to post and retrieve at least one flag at a height greater than the hand-reach of the user while standing upon the ground, comprising: at least one flag-pole receiver structured and arranged to receive an end of at least one flag pole at an upward angle; at least one surface mount structured and arranged to mount on at least one substantially vertical surface at a height greater than the hand-reach of the user; at least one coupler structured and arranged to couple such at least one flag-pole receiver to such at least one surface mount; wherein such at least one coupler permits rotation of such at least one flag-pole receiver with respect to such at least one surface mount over at least a range of 90 degrees; at least one position stop structured and arranged to stop and maintain such at least one coupler at at least one display position of the at least one flag; at least one position release structured and arranged to release such at least one coupler maintained at such at least one display position and permit such at least one flag-pole receiver to rotate down to allow user retrieval of the at least one flag while the user is standing on the ground; wherein, when such at least one surface mount is at a height greater than the hand-reach of the user, such at least one flag-pole receiver requires a lowered position to post and retrieve the at least one flag; wherein such at least one surface mount is now mountable at a height greater than the hand-reach of the user while the user is still able to post, raise, lower and retrieve the flag while standing on the ground.

Additionally, it provides such a flag mount system further comprising at least one flag-pole hook-rod structured and arranged to permit user-manipulation of such at least one flag pole when such at least one flag pole is out of the hand-reach of the user while the user is standing on the ground. Also, it provides such a flag mount system wherein such at least one flag-pole receiver comprises at least one under-eaves configuration structured and arranged to retract under eaves of a roof when rotated down. In addition, it provides such a flag mount system further comprising at least one friction grommet structured and arranged to fit on the end of such at least one flag pole and create a friction fit between such at least one flag-pole receiver and such at least one flag pole.

And, it provides such a flag mount system wherein such at least one flag-pole receiver further comprises at least one funnel-end structured and arranged to guide such end of such at least one flag pole into such at least one flag-pole receiver. Further, it provides such a flag mount system wherein such at least one position stop stops and maintains positions at about 15 degree intervals.

In accordance with another preferred embodiment hereof, this invention provides a flag mount system, relating to a user's capability to post and retrieve at least one flag at a height greater than the hand-reach of the user while standing upon the ground, comprising: flag-pole receiver means for receiving posting of the at least one flag on at least one flag pole; surface mount means for mounting on at least one substantially vertical surface at a height greater than the hand-reach of the user; flag-pole retainer means for retaining at least one end of such at least one flag pole in such flag-pole receiver means until the user retrieves the at least one flag; connector means for connecting such flag-pole receiver means and such surface mount means; wherein such connector means comprises rotation permitter means for permitting rotation of such flag-pole receiver of at least 90 degrees; wherein such rotation comprises a full-mast raised position of the at least one flag, a half-mast raised position of the at least one flag, and a lowered position of the at least one flag; wherein after posting the at least one flag, upward movement of such at least one flag pole by the user rotates such flag-pole receiver means to rotate toward at least one raised position of such full-mast raised position and such half-mast raised position; wherein such rotation permitter means comprises position maintainer means for maintaining such at least one raised position until released, and position releaser means for releasing such at least one raised position and permitting lowering of such flag-pole receiver means to such lowered position, wherein such position maintainer means and such position releaser means are activated through manipulation of such at least one flag pole by the user while the user is standing on the ground; wherein, when such surface mount means is at a height greater than the hand-reach of the user, such flag-pole receiver means requires such lowered position to post and retrieve the at least one flag; wherein such surface mount means is now mountable at a height greater than the hand-reach of the user while the user is still able to post, raise, lower and retrieve the flag while standing on the ground.

Even further, it provides such a flag mount system further comprising flag-pole manipulator means for user manipulation of such at least one flag pole when such at least one flag pole is out of the hand-reach of the user while the user is standing on the ground. Even further, it provides such a flag mount system further comprising flag-pole axial twister means for axial twisting such at least one flag pole preventing the at least one flag from wrapping around such at least one flag pole. Even further, it provides such a flag mount system further comprising eaves-retractor means for retracting such flag-pole receiver means under at least one roof eaves when in such lowered position. Even further, it provides such a flag mount system wherein such flag-pole receiver means further comprises pole-end guide means for guiding such at least one end of such at least one flag-pole into alignment with such flag-pole receiver means.

In accordance with another preferred embodiment hereof, this invention provides a system, related to mounting multiple flag poles, comprising: at least one flag pole mount structured and arranged to mount at least one flag pole onto a substantially vertical surface; at least one flag pole coupler structured and arranged to couple such at least one flag pole to such at least one flag pole mount; wherein such at least one flag pole coupler comprises at least one rotation restricting geometry structured and arranged to restrict rotation of such at least one flag pole coupler about a longitudinal axis; wherein such at least one flag pole coupler comprises at least one flag pole portion structured and arranged to attach to such at least one flag pole, and at least one mount receiver portion structured and arranged to receive such at least one flag pole portion on such at least one flag pole mount.

Moreover, it provides such a system wherein such at least one flag pole portion comprises at least two flag pole receivers each structured and arranged to receive such at least one flag pole simultaneously. Additionally, it provides such a system: wherein such at least one rotation restricting geometry comprises a cross-section perpendicular to a longitudinal axis; and wherein such cross-section comprises at least one deviation from round.

Also, it provides such a system: wherein such at least one rotation restricting geometry comprises a cross-section perpendicular to a longitudinal axis; and wherein such cross-section comprises at least one deviation from round. In addition, it provides such a system wherein such at least one rotation restricting geometry comprises a squared cross-section. And, it provides such a system wherein such at least one flag pole mount comprises: at least one surface mount structured and arranged to mount on at least one substantially vertical surface; at least one rotational hinge joint structured and arranged to hingedly joint such at least one surface mount and such at least one mount receiver portion; wherein such at least one rotational hinge joint permits rotation of such at least one mount receiver portion of at least 90 degrees with respect to such at least one surface mount, and comprises at least three positions of such at least one mount receiver portion that can be maintained by such at least one rotational hinge joint, and comprises at least one position releaser structured and arranged to release a maintained position through the application of a tangential force applied to such at least one rotational hinge joint through such at least one mount receiver portion.

Further, it provides such a system: wherein such at least three positions comprise a full-mast raised position of the at least one flag, a half-mast raised position of the at least one flag, and a lowered position of the at least one flag; and wherein such rotation of such at least one rotational hinge joint comprises a unidirectional rotation from such lowered position, through such half-mast raised position and through such full-mast raised position, and comprises an opposite unidirectional rotation from past such full-mast raised position to such lowered position; and wherein rotation past such full-mast raised position reverses directionality of rotation. Even further, it provides such a system wherein such at least three positions comprise 15 degree intervals.

Moreover, it provides such a system further comprising at least one flag-pole manipulator structured and arranged to permit user-manipulation of such at least one flag pole. Additionally, it provides such a system: wherein such at least one flag-pole manipulator comprises at least one flag-pole engager structured and arranged to engage such at least one flag pole; wherein such at least one flag-pole engager comprises at least one opening structured and arranged to allow lateral insertion of such at least one flag pole into such at least one flag-pole engager, at least one occluding geometry structured and arranged to at least partially occlude such at least one opening through altering the orientation of such at least one flag-pole engager with respect to such at least one flag pole.

Also, it provides such a system wherein such at least one occluding geometry comprises at least one protrusion structured and arranged to protrude from at least one side of such at least one flag-pole engager. In addition, it provides such a system: wherein such at least one flag-pole engager comprises three sides, such at least one opening being a forth side; wherein such three sides bound a channel in which such at least one flag pole can be laterally inserted through such at least one opening; and wherein such at least one protrusion protrudes parallel to such channel along at least one side of such three sides; wherein, when such at least one flag-pole engager is twisted where such at least one flag pole is askew in such channel, such at least one protrusion positions over such at least one flag pole restricting the lateral movement of such at least one flag pole.

And, it provides such a system wherein such at least one flag pole portion comprises at least two flag pole receivers each structured and arranged to receive such at least one flag pole simultaneously. Further, it provides such a system wherein such at least one rotation restricting geometry comprises a cross-section comprising at least one deviation from round. Even further, it provides such a system further comprising at least one eaves-retractor structured and arranged to retract such at least one flag-pole receiver under at least one roof eaves when in such lowered position.

In accordance with another preferred embodiment hereof, this invention provides a system, relating to coupling two flag poles to a single flag pole mount, comprising: a flag-pole mount structured and arranged to mount two flag poles onto a substantially vertical surface; a coupler structured and arranged to couple two flag poles to such flag-pole mount; wherein such flag-pole mount comprises a receiver structured and arranged to receive such coupler, and a hinged joint structured and arranged to hingedly join such receiver to such flag-pole mount; wherein such coupler linearly inserts into such receiver, and couples and decouples with such receiver using a force, upon such coupler, linear to the direction of insertion; wherein such coupler and such receiver comprise a spin restricting geometry structured and arranged to restrict spinning of such coupler in such receiver; The system: wherein such hinged joint comprises a directional ratchet allowing unidirectional rotation until reaching a maximum rotation where the direction of allowed rotation is reversed; wherein such hinged joint comprises at least two positions that are maintained by such hinged joint against gravity.

Even further, it provides such a system further comprising: a flag-pole manipulator comprising a handle and a flag-pole engager; wherein such flag-pole engager comprises a base, two sides, a channel between such two sides, and a first protrusion protruding from a first side of such two sides a second protrusion protruding from a second side of such two sides wherein such first protrusion and such second protrusion protrude parallel to such channel and opposite from each other wherein when a flag pole is positioned in such channel and such flag-pole engager is twisted the flag pole is locked into such channel, having three sides of flag pole touching such base and such two sides and having the forth side engaged by both such first protrusion and such second protrusion. Even further, it provides such a system: wherein such spin restricting geometry comprises a cross-section perpendicular to a longitudinal axis; and wherein such cross-section comprises at least one deviation from round. Even further, it provides such a system wherein such spin restricting geometry comprises a squared cross-section. Each and every novel feature, element, combination, step and/or method disclosed or suggested by this patent application.

BRIEF DESCRIPTION OF THE DRAWINGS

FIG. 3 shows a side view of the flag-mount bracket, according to a preferred embodiment of FIG. 2.

FIG. 4 shows a top view of the flag-mount bracket, according to a preferred embodiment of FIG. 3.

FIG. 5 shows a sectional front view 5-5 of FIG. 4 showing flag-mount bracket, according to a preferred embodiment of FIG. 4.

FIG. 6 shows a front view of the flag-mount bracket, according to a preferred embodiment of FIG. 5.

FIG. 7 shows a side view of the bracket-mount portion of flag-mount bracket, according to a preferred embodiment of FIG. 2A.

FIG. 8 shows a partial side view of the flag-arm portion of flag-mount bracket, according to a preferred embodiment of FIG. 7.

FIG. 9 shows a side view of the bracket-mount portion of flag-mount bracket, according to an alternately preferred embodiment of the present invention.

FIG. 10 shows a partial side view of the flag-arm portion of flag-mount bracket, according to an alternately preferred embodiment of FIG. 9.

FIG. 11 shows a partial side view of a specially designed flag-mount-posting pole, according to the preferred embodiment of FIG. 1.

FIG. 12 shows a perspective view of the flag-mount bracket in use, mounted under the eaves of a structure, according to an alternately preferred embodiment of the present invention.

FIG. 13 shows a side view of the flag-mount bracket in use, according to the preferred embodiment of FIG. 12.

FIG. 20 shows a perspective view of flag-arm portion of flag-mount bracket depicting flag-securing stopper on the flag pole, according to a preferred embodiment of FIG. 15.

FIG. 32 shows a perspective view of flag-securing-sheath adapter according to an alternately preferred embodiment of the present invention.

FIG. 33 Shows a perspective view of flag-securing-sheath adapter according to an alternately preferred embodiment of the present invention.

DETAILED DESCRIPTION OF THE BEST MODES AND PREFERRED EMBODIMENTS OF THE INVENTION

Generally, in order to post a flag in most flag brackets of today, in a location in which a user would choose to fly a flag (on the eaves of a structure, on a column of a structure, on an exterior wall of a structure, etc.) the bracket must be located above the hand-reach of the user in order for the flag to fly high enough to avoid interference with its ability to fly properly. As a result a user must climb a ladder, adjust the bracket to the desired angle and height (if the user can and needs to), loosen a bolt or screw, post the flag into the bracket, tighten the bolt or screw, and then climb down the ladder. Conversely, when the user desires to remove the flag, he/she must again climb a ladder, loosen the bolt or screw, retrieve the flag and then climb back down the ladder. This can be dangerous, especially for people who are elderly, disabled, or short in stature, making it difficult for them to safely climb up and down a ladder. For the purposes of this application, it will be understood that the hand-reach of the user is the height at which a flag bracket may still be reached from the ground by a user and post a flag directly at a display angle without the need of removing feet from the ground (ie. climb a ladder or stool). In other words, a user can hold the end of the flag pole at about a 45 degree angle above horizontal and still reach high enough from the ground to insert the end of the flag pole into the bracket. While Applicant understands that the measured height of the hand-reach will vary user to user, the features of the invention directly addresses the ability of the user to post a flag using the invention described herein to a bracket at a height above the hand-reach of the user. Features of the invention disclosed herein permits the posting of a flag to be achieved at an upward angle rather than a downward or horizontal angle, thus extending the bracket height a user can post a flag to without extending the hand-reach of the user.

Additionally, most flag brackets are designed to hold a flag in a static position. As a result, when there is more than a slight breeze, the flag will tend to blow around the pole until it is completely wrapped around the pole and no longer visible. Furthermore, there may be situations where a person may want the flagpole bracket to be hidden, when not in use, or to have only the flag itself visible when it is in use.

Figure 1:
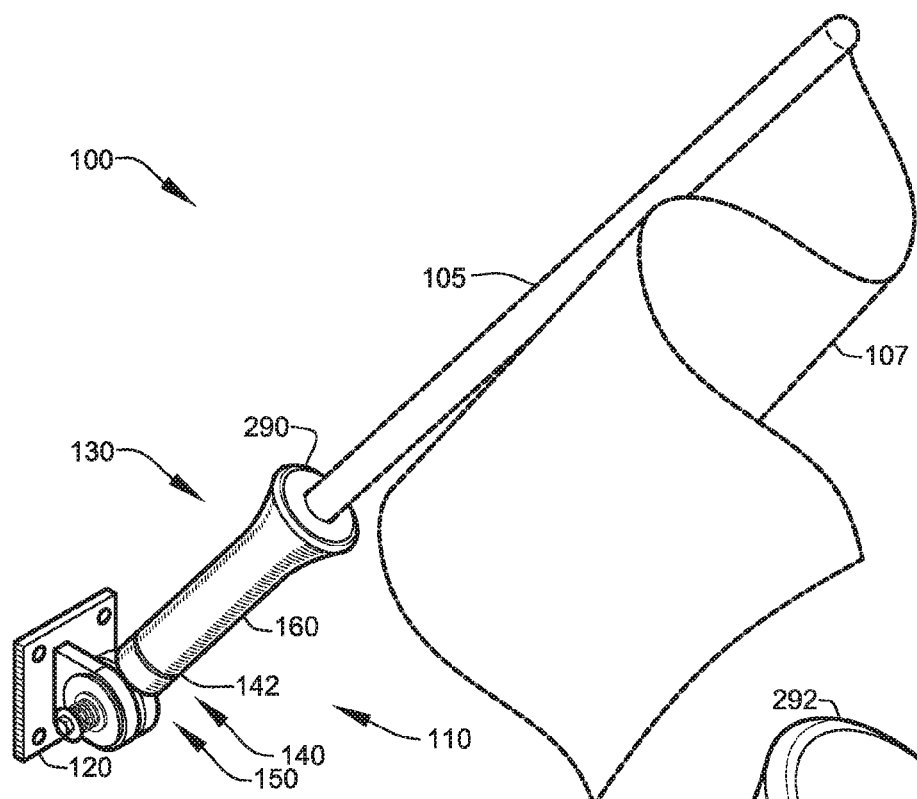
FIG. 1 shows a perspective view of the flag-mount bracket of flag-mount bracket system in use with a flag posted and raised, according to a preferred embodiment of the present invention.
Figure 2A:
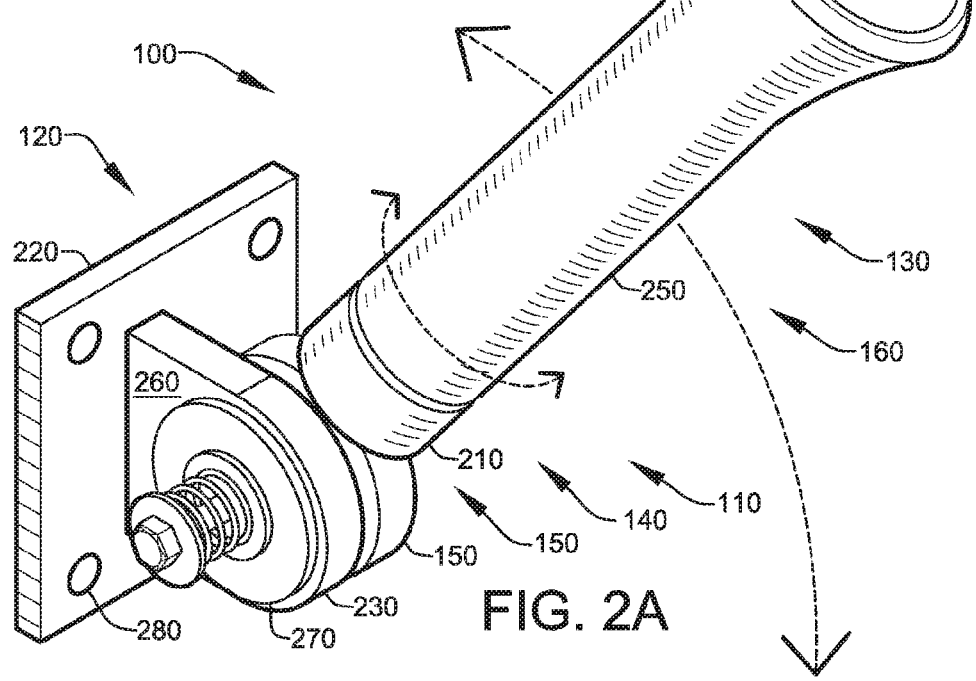
FIG. 2A shows a perspective view of the flag-mount bracket, according to a preferred embodiment of FIG. 1.
Figure 2B:
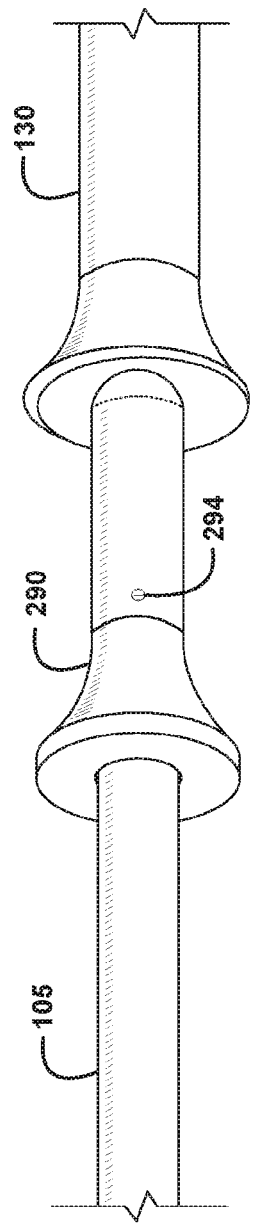
FIG. 2B shows a perspective view of flag-arm portion of flag-mount bracket depicting flag-securing sheath extended out of flag-arm portion, according to a preferred embodiment of FIG. 2A.

FIG. 1 shows a perspective view of the flag-mount bracket 110 of flag-mount bracket system 100 in use with a flag 107 posted and raised, according to a preferred embodiment of the present invention. FIG. 2A shows a perspective view of the flag-mount bracket 110, according to a preferred embodiment of FIG. 1. FIG. 2B shows a partial side perspective view of flag-arm portion 130 of flag-mount bracket 110 depicting flag-securing sheath 290 on the end of flag pole 105 extended out of flag-arm portion 130, according to a preferred embodiment of FIG. 2A. FIG. 7 shows a side view of the bracket-mount portion 120 of flag-mount bracket 110, according to a preferred embodiment of FIG. 2A. FIG. 8 shows a partial side view of the flag-arm portion 130 of flag-mount bracket 110, according to a preferred embodiment of FIG. 7. FIG. 9 shows a side view of the bracket-mount portion 120 of flag-mount bracket 110, according to an alternately preferred embodiment of the present invention. FIG. 10 shows a partial side view of the flag-arm portion 130 of flag-mount bracket 110, according to an alternately preferred embodiment of FIG. 9.

Flag-mount bracket 110 (at least embodying herein at least one surface mount structured and arranged to mount on at least one substantially vertical surface at a height greater than the hand-reach of the user; and at least embodying herein surface mount means for mounting on at least one substantially vertical surface at a height greater than the hand-reach of the user; and at least embodying herein at least one flag pole mount structured and arranged to mount at least one flag pole onto a substantially vertical surface) preferably comprises at least one bracket-mount portion 120 (at least embodying herein at least one flag pole coupler structured and arranged to couple such at least one flag pole to said at least one flag pole mount; and at least herein embodying wherein said at least one flag pole coupler comprises at least one flag pole portion structured and arranged to attach to such at least one flag pole; and at least herein embodying wherein said at least one flag pole coupler comprises at least one rotation restricting geometry structured and arranged to restrict rotation of said at least one flag pole coupler about a longitudinal axis) for mounting on a structure, such as, for example, a building façade, a building eave, a building column, etc., and at least one flag-arm portion 130 (at least embodying herein at least one flag-pole receiver structured and arranged to receive posting of the at least one flag on at least one flag pole; and at least embodying herein at least one flag-pole receiver structured and arranged to receive an end of at least one flag pole at an upward angle; and at least embodying herein flag-pole receiver means for receiving posting of the at least one flag on at least one flag pole; and at least one flag pole portion structured and arranged to attach to such at least one flag pole; and at least herein embodying wherein said at least one flag pole coupler comprises at least one mount receiver portion structured and arranged to receive said at least one flag pole portion of said at least one flag pole mount) which receives the end of the flag pole and allows for posting of a flag, as shown.

Flag-mount bracket 110 preferably comprises at least one durable material, preferably durable metal, preferably aluminum, alternately preferably durable plastic, preferably nylon. Upon reading the teachings of this specification, those skilled in the art will now appreciate that, under appropriate circumstances, considering such issues as user preference, cost, available materials, new technology, etc., other materials, such as, for example, pot metal, die cast metal, steel, other metals, polyurethane, polypropylene, polyethylene, other plastics, etc., may suffice.

Flag-mount bracket 110 preferably comprises molded construction, alternately preferably welded construction. Upon reading the teachings of this specification, those skilled in the art will now appreciate that, under appropriate circumstances, considering such issues as user preference, materials used, manufacturing preferences etc., other forms of construction, such as, for example, 3-D printing, CNC construction, bonding, etc., may suffice.

Bracket-mount portion 120 preferably comprises at least one bracket-mount-plate portion 220 and at least one flag-arm-attacher portion 230 (see FIG. 2A). Flag-arm portion 130 preferably comprises at least one bracket-attacher end 150 and at least one flag-receiver arm 160 (see FIG. 2A).

Bracket-mount-plate portion 220 preferably comprises a shaped plate, preferably a square shaped plate, as shown. Upon reading the teachings of this specification, those skilled in the art will now appreciate that, under appropriate circumstances, considering such issues as user preference, cost, available materials, etc., other shapes, such as, for example, rectangular shape, oval shape, round shape, etc., may suffice. Bracket-mount-plate portion 220 preferably further comprises at least one fastener receiver, preferably hole 280, preferably at least four holes 280, which allow attaching flag-mount bracket 110 (at least herein embodying wherein said at least one flag pole mount comprises at least one surface mount structured and arranged to mount on at least one substantially vertical surface) to the desired mount location, as shown. Each of the at least four holes 280 are preferably located at a corner of bracket-mount-plate portion 220, as shown. Bracket-mount-plate portion 220 is preferably mounted to the desired location using at least one fastener, preferably screws. Upon reading the teachings of this specification, those skilled in the art will now appreciate that, under appropriate circumstances, considering such issues as user preference, cost, available materials, etc., other fasteners, such as, for example, wood screws, flat head screws, round head screws, counter-sunk screws, bolts, other fasteners, etc., may suffice.

Flag-arm-attacher portion 230 preferably attaches to bracket-mount-plate portion at a 90 degree angle relative to the plane of bracket-mount-plate portion, as shown. Flag-arm-attacher portion 230 preferably comprises hole 710 (see FIG. 7) through the center of the end of flag-arm-attacher portion 230 that is opposite bracket-mount-plate portion 220. Flag-arm-attacher portion 230 preferably comprises at least one outer face 260 (see FIG. 2A). Outer face 260 preferably comprises at least one raised area 270 around hole 710, as shown. Raised area 270 preferably comprises at least one shape, preferably a circular shape, as shown. Upon reading the teachings of this specification, those skilled in the art will now appreciate that, under appropriate circumstances, considering such issues as user preference, shape of flag-arm-attacher portion 230, etc., other raised area shapes, such as, for example, oval, square, rectangle, etc., may suffice.

Flag-arm-attacher portion 230 preferably further comprises at least one inner face 720 (See FIG. 7). Inner Face 720 preferably comprises at least one raised area 730 around hole 710, as shown. Raised area 730 preferably comprises at least one shape, preferably a circular shape, as shown. Upon reading the teachings of this specification, those skilled in the art will now appreciate that, under appropriate circumstances, considering such issues as user preference, shape of flag-arm-attacher portion 230 etc., other raised area shapes, such as, for example, oval, square, etc., may suffice. Raised area 730 preferably further comprises at least one bracket-lock 745. Bracket-lock 745 preferably comprises a "bump and divot" locking system. Bracket-lock 845 preferably comprises hemispherical divot 740, preferably a plurality of hemispherical divots 740 which are located at 15 degree increments around the perimeter of raised area 730, as shown. Hemispherical divots 740 preferably correspond to hemispherical bumps 820 of bracket-attacher end 150 of flag-arm portion 130 of flag-mount bracket 110 (see FIG. 8) which will be discussed below.

Flag-arm portion 130 preferably comprises at least one bracket-attacher end 150 (at least embodying herein at least one connector structured and arranged to connect said at least one flag-pole receiver and said at least one surface mount; and at least embodying herein at least one coupler structured and arranged to couple said at least one flag-pole receiver to said at least one surface mount; and at least embodying herein connector means for connecting said flag-pole receiver means and said surface mount means) for attaching flag-arm portion 130 to bracket mount portion 120, as shown. Bracket-attacher end 150 preferably comprises at least one attacher-plate portion 830, as shown. Attacher-plate portion 830 preferably comprises at least one shape which corresponds to the shape of raised area 730 of flag-arm-attacher portion 130, as shown. Bracket-attacher end 150 preferably comprises at least one raised area 840 (see FIG. 8) which corresponds in shape and size to raised area 730 of flag-arm attacher portion 130.

Bracket-attacher end 150 preferably further comprises at least one outer face 240. Outer face 240 comprises a smooth surface. Bracket-attacher end 150 preferably further comprises at least one hole 810 in the center which corresponds to hole 710 of flag-arm attacher portion 230, as shown. Bracket-attacher end 150 preferably further comprises at least one inner face 850, as shown. Inner face 850 preferably comprises at least one raised area 840, as shown lo. Raised area 840 preferably comprises at least one bracket-lock 845. Bracket-lock 845 preferably comprises a "bump and divot" locking system. Bracket-lock 845 preferably comprises hemispherical bump 820, preferably a plurality of hemispherical bumps 820 which are located at 15 degree increments around the perimeter of raised area 840, as shown. The plurality of hemispherical bumps 820 preferably correspond to the plurality of hemispherical divots 740 of flag-arm-attacher portion 230 of bracket-mount portion 120 of flag-mount bracket 110 (see FIG. 8).

Flag-arm portion 130 preferably comprises at least one flag-receiver arm 160 which receives flag pole 105. Flag-receiver arm 160 is preferably molding attached, alternately preferably welding attached to bracket-attacher end 150, as shown. Flag-receiver arm 160 preferably comprises cylindrical tube. Flag-receiver end 292 of flag-receiver arm 160 preferably comprises a flared construction such that flag-receiver arm 160 comprises a "trumpet-like" shape which allows for easier insertion of a flag pole into flag-mount bracket 110 (at least herein embodying wherein said at least one flag-pole receiver further comprises at least one pole-end guide structured and arranged to guide such at least one end of such at least one flag-pole into alignment with said at least one flag-pole receiver; and at least herein embodying wherein said at least one pole-end guide comprises a funnel-shaped structure; and at least herein embodying wherein said at least one flag-pole receiver further comprises at least one funnel-end structured and arranged to guide such end of such at least one flag pole into said at least one flag-pole receiver; and at least herein embodying wherein said flag-pole receiver means further comprises pole-end guide means for guiding such at least one end of such at least one flag-pole into alignment with said flag-pole receiver means), as shown. Flag-receiver arm 160 preferably further comprises at least one flag-securing sheath 290 (at least herein embodying at least one flag-pole retainer structured and arranged to retain at least one end of such at least one flag pole in said at least one flag-pole receiver until the user retrieves the at least one flag; and at least herein embodying flag-pole retainer means for retaining at least one end of such at least one flag pole in said flag-pole receiver means until the user retrieves the at least one flag), which fits inside flag receiver arm 160 to allow for a secure posting of flag 107, as shown. Flag-securing sheath 290 preferably comprises pliable-metal-engaging material, preferably silicone (at least herein embodying wherein said at least one flag-pole retainer comprises at least one friction-fit retainer structured and arranged to retain such at least one flag pole in said at least one flag-pole receiver through friction), as shown. Flag-securing sheath 290 is preferably placed on the end of flag pole 105 opposite flag 107, (at least herein embodying wherein said at least one friction-fit retainer mounts to such at least one flag-pole), as shown. Flag-securing sheath 290 preferably further comprises at least one fastener 294, preferably a screw, preferably a set-screw which is screwed into flag pole 105 to secure flag-securing sheath 290 onto flag pole 105 (at least embodying herein at least one friction grommet structured and arranged to fit on the end of such at least one flag pole and create a friction fit between said at least one flag-pole receiver and such at least one flag pole), (see FIG. 2B). When flag pole 105 is preferably posted into flag-mount bracket 110, flag-securing sheath 290 engages flag-mount bracket 110 to hold flag pole 105 securely within flag-mount bracket 110 (see FIG. 1).

Flag-receiver arm 160 preferably comprises a cut in the cylinder which divides flag-receiver arm 160 (at least embodying herein at least one axial twister structured and arranged to axial twist such at least one flag pole preventing the at least one flag from wrapping around such at least one flag pole; and at least embodying herein flag-pole axial twister means for axial twisting such at least one flag pole preventing the at least one flag from wrapping around such at least one flag pole) into two sections, as shown. Therefore, flag-receiver arm 160 preferably comprises static-section 210 and rotational-section 250. Rotational-section 250 is attached to static-section 210 such that rotational-section 250 is free to axially rotate 360 degrees. The details of the assembly to attach rotational-section 250 to static-section 210 are not provided here, since one of ordinary skill in the art, upon reading this specification, will appreciate how the present embodiments may be used in conjunction with such assembly. Rotational-section 250 preferably comprises flag-wrapping-preventer 140 for preventing flag 107 from wrapping around the flag pole 105 when there is a strong wind, as shown. Flag-wrapping-preventer 140 preferably comprises rotational point 142 between rotational-section 250 and static-section 210 which allows rotational-section 250 to rotate 360 degrees. When a wind which would tend to blow flag 107 around flag pole 105, flag-wrapping-preventer 140 will allow rotational-section 250 of flag-receiver arm 160 to rotate at rotational point 142 thus preventing flag 107 from wrapping around flag pole 105, as shown.

FIG. 9 shows a side view of the bracket-mount portion 910 of flag-mount bracket 110, according to an alternately preferred embodiment of the present invention. FIG. 10 shows a partial side view of the flag-arm portion 130 of flag-mount bracket 110, according to an alternately preferred embodiment of FIG. 9. Bracket-mount portion 910 replaces bracket-mount portion 120 and flag-arm portion 1010 replaces flag-arm portion 130, as shown. Bracket-mount portion 910 and flag-arm portion 1010 are assembled in the same manner, described below, as bracket-mount portion 120 and flag-arm portion 130. Many of the features of bracket-mount portion 910 and flag-arm portion 1010 are repeated from preferred bracket-mount portion 120 and flag-arm portion 130 respectively of flag-mount bracket 110, as shown.

Bracket-mount portion 910 preferably comprises bracket-mount-plate portion 220 and flag-arm-attacher portion 960, as shown. Flag-arm-attacher portion 960 preferably comprises inner face 920, as shown. Inner face 920 preferably comprises raised area 940, as shown. Raised area 940 preferably comprises bracket-lock 975. Bracket-lock 975 preferably comprises a ratchet-lock, preferably a "saw tooth" 970, preferably a plurality of "saw teeth" 970 which replace the hemispherical divots 740 of flag-mount bracket 110. "Saw teeth" 970 preferably comprise alternating teeth and grooves.

Flag-arm portion 1010 preferably comprises bracket-attacher end 1050 and flag-receiver arm 1060, as shown. Bracket-attacher end 1050 preferably comprises inner face 850, as shown. Inner face 850 preferably comprises raised area 840, as shown. Raised area 840 preferably comprises bracket-lock 975. Bracket-lock 975 preferably comprises a ratchet-lock, preferably a "saw tooth" 1020, preferably a plurality of "saw teeth" 1020 which replace the hemispherical bumps 820 of flag-mount bracket 110. "Saw teeth" 1020 preferably comprise alternating teeth and grooves, as shown. "Saw-teeth" 1020 (at least herein embodying wherein said at least one position maintainer maintains positions at about 15 degree intervals; and at least herein embodying wherein said at least one position stop stops and maintains positions at about 15 degree intervals) are located at 15 degree increments similar to the location of hemispherical divots 740 and hemispherical bumps 820, as shown.

Figure 2O:
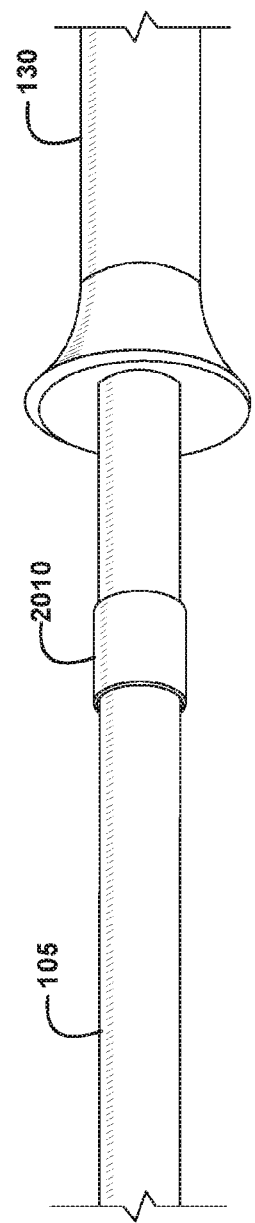

FIG. 3 shows a side view of the flag-mount bracket 110, depicting the rotation of flag-mount bracket 110, according to a preferred embodiment of FIG. 2. FIG. 4 shows a top view of the flag-mount bracket, depicting flag-mount bracket 110 fully assembled, according to a preferred embodiment of FIG. 3. FIG. 5 shows a sectional front view 5-5 of FIG. 4 showing flag-mount bracket 110, with flag-receiver arm 160 removed to show bracket-mount portion 120 assembled with flag-arm portion 130, according to a preferred embodiment of FIG. 4. FIG. 6 shows a front view of the flag-mount bracket 110, with flag-receiver arm 160 in place, according to a preferred embodiment of FIG. 5.

Flag-mount bracket 110 preferably further comprises spring assembly 410 (see FIG. 4). Spring assembly 410 preferably comprises at least one at least one fastener 510, preferably at least one nut 515 and bolt 540, as shown. Upon reading the teachings of this specification, those skilled in the art will now appreciate that, under appropriate circumstances, considering such issues as user preference, available materials, manufacturing preference, etc., other fasteners, such as, for example, screws, rivets, anchor screws, etc., may suffice. Spring assembly 410 further comprises at least one compression-force adjuster 520, preferably at least one spring 525 (see FIG. 5), and at least one washer 530, preferably at least three washers 530 (see FIG. 5).

Flag-mount bracket 110 is preferably assembled by putting bracket-mount portion 120 and flag-arm portion 130 together; raised area 270 comprising inner face 720 is aligned with raised area 840 comprising inner face 850. Inner face 720 and inner face 850 are preferably aligned such that hemispherical bumps 820 align to fit inside hemispherical divots 740. Bolt 540 is placed through at least one washer 530, hole 810 of bracket-attacher end 150 of flag-arm portion 130, hole 710 of flag-arm-attacher portion 230 of bracket-mount portion 120 at least one washer 530, spring 525 and at least one washer 530, as shown. Nut 540 is then screwed onto bolt 540, and tightened to hold the assembly together, as well as to place a compression force on spring 525, as shown.

The compression force, on spring 525, pushes bracket-attacher end 150 and flag-arm-attacher portion 230 tightly together, as shown. Additionally, fastener 510 of flag-mount bracket 110 acts as a rotational hinge joint for flag-mount bracket 110. Therefore, the more compression force that is placed on spring 525, the more difficult it is to rotate flag-arm portion around the rotational hinge joint. As flag-mount bracket 110 is rotated (at least embodying herein at least one rotational hinge joint structured and arranged to hingedly join said at least one surface mount and said at least one mount receiver portion), hemispherical bumps 820 slide out of hemispherical divots and then "pop" back into an adjacent hemispherical divot, allowing flag-arm portion 130 to be repositioned and locked at a user chosen angle. The more compression nut 540 exerts onto spring 525, the more difficult it becomes to rotate flag-arm portion 130. Each hemispherical divot 740/hemispherical bump 820 position constitutes a stop-angle Q (at least herein embodying wherein said at least one rotational hinge joint permits rotation of at least 90 degrees with respect to said at least one surface mount) (see FIG. 3). Stop-angle Q preferably comprises any angle between 0 degrees (flag-arm portion 130 pointing straight down at the ground) to 180 degrees (flag-arm portion 130 pointing straight upward). As discussed above, hemispherical divots 740 and hemispherical bumps 820 are positioned at 15 degree increments. Therefore a user can choose to "lock" flag-arm portion 130 at any stop-angle Q desired between 0 degrees and 180 degrees at 15 degree increments.

FIG. 11 shows a partial side view of a specially designed flag-mount-posting pole 1110 (at least embodying herein at least one flag-pole manipulator structured and arranged to permit user-manipulation of such at least one flag pole when such at least one flag pole is out of the hand-reach of the user while the user is standing on the ground) of flag-mount bracket system 100, according to the preferred embodiment of FIG. 1. Flag-mount bracket system 100 preferably comprises flag-mount-posting pole 1110 (at least embodying herein at least one flag-pole hook-rod structured and arranged to permit user manipulation of such at least one flag pole when such at least one flag pole is out of the hand-reach of the user while the user is standing on the ground; and at least herein embodying flag-pole manipulator means for user manipulation of such at least one flag pole when such at least one flag pole is out of the hand-reach of the user while the user is standing on the ground) which is specially designed to allow a user to post, retrieve, raise and lower a flag 107 from the ground without the need to use a ladder, as shown. Flag-mount-posting pole 1110 preferably comprises at least one pole, preferably at least one telescoping pole 1140, as shown. The details of the structure and assembly of telescoping pole 1140 is not provided here, since one of ordinary skill in the art, upon reading this specification, will appreciate how the present embodiments may be used in conjunction with such structure and assembly. Flag-mount-posting pole 1110 preferably further comprises at least one raising hook 1130 structured and arranged to aid a user in raising flag 107 from the ground without the need to use a ladder; and at least one lowering-hook 1120 structured and arranged to aid a user in lowering flag 107 from the ground without the need to use a ladder, as shown.

In order to post and raise a flag, a user would telescope flag-mount-posting pole 1110 (at least herein embodying wherein said at least one position maintainer and said at least one position releaser are activated through manipulation of such at least one flag pole by the user while the user is standing on the ground; and at least herein embodying wherein said position maintainer means and said position releaser means are activated through manipulation of such at least one flag pole by the user while the user is standing on the ground) to a desired length which would allow the user to reach flag-mount bracket 110 without the need for a ladder. The user would then lower flag-mount-bracket 110 to a "posting" position (illustrated by the dashed line on FIG. 3) by reaching up and inserting flag-mount bracket 110 between raising hook 1130 and lowering hook 1120, and pulling downward on flag-mount bracket with lowering hook 1120 (at least herein embodying wherein, when said at least one surface mount is at a height greater than the hand-reach of the user, said at least one flag-pole receiver requires such lowered position to post and retrieve the at least one flag; and at least herein embodying wherein said at least one surface mount is now mountable at a height greater than the hand-reach of the user while the user is still able to post, raise, lower and retrieve the flag while standing on the ground; and at least herein embodying wherein, when said surface mount means is at a height greater than the hand-reach of the user, said flag-pole receiver means requires such lowered position to post and retrieve the at least one flag). Flag-mount bracket 110 will rotate downward, clicking into each 15 degree increment until it has reached the desired position. Flag pole 107 with flag-securing-sheath 290 attached can then be posted into flag-receiver end 292 of flag receiver arm 160; and then using the raising hook 1130, the user can raise the flag to any desired stop-angle Q (at least herein embodying wherein after posting the at least one flag, upward movement of such at least one flag pole by the user rotates said at least one flag-pole receiver toward at least one raised position of such full-mast raised position and such half-mast raised position; and at least herein embodying wherein after posting the at least one flag, upward movement of such at least one flag pole by the user rotates said flag-pole receiver means to rotate toward at least one raised position of such full-mast raised position and such half-mast raised position) which the user deems appropriate to fly flag 107.

Figure 14:
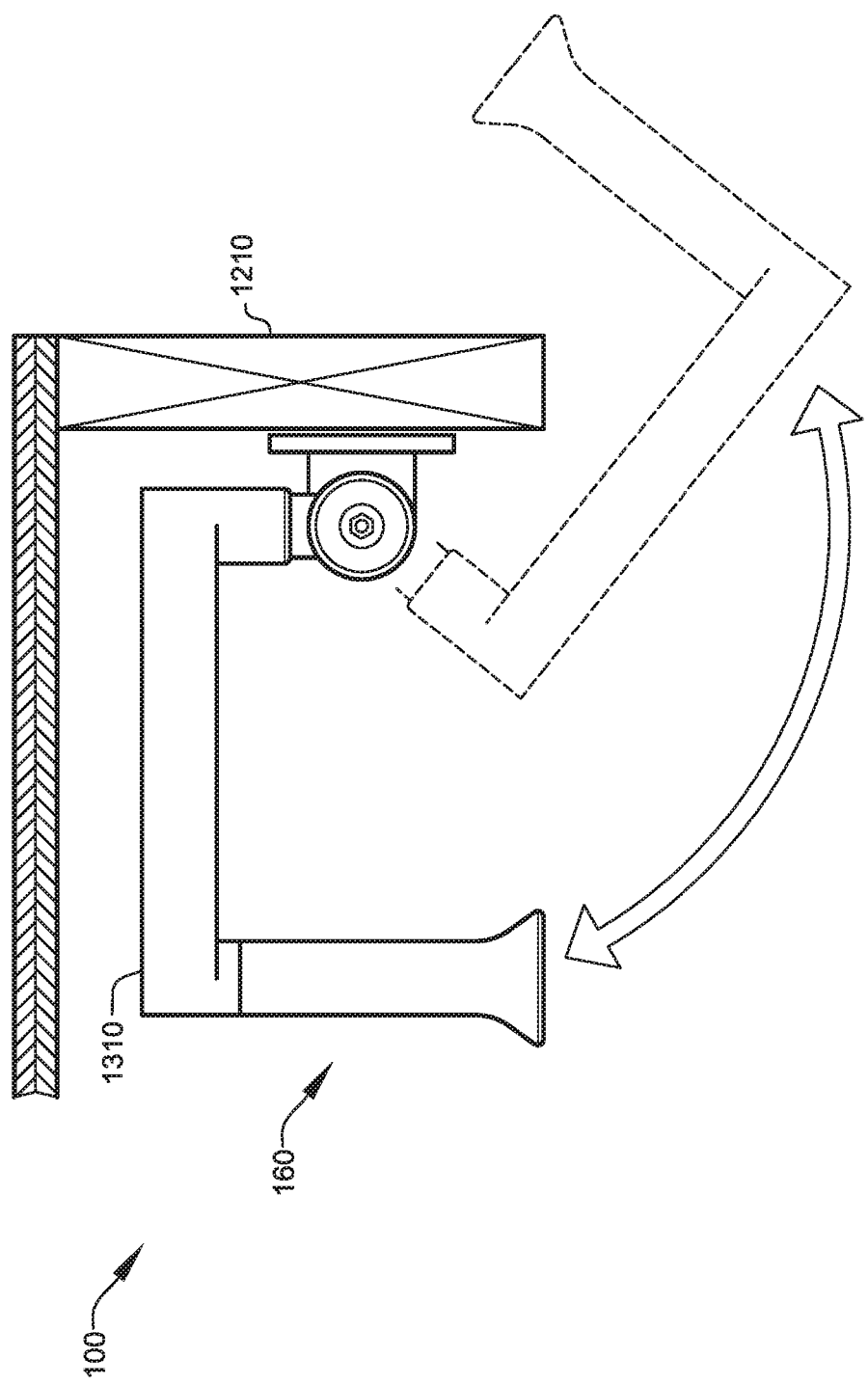
FIG. 14 shows a side view of the flag-mount bracket, according to the preferred embodiment of FIG. 13.

FIG. 12 shows a perspective view of the flag-mount bracket 110 of flag-mount bracket system 100 in use, mounted under the eaves 1210 of a structure, according to an alternately preferred embodiment of the present invention. FIG. 13 shows a side view of the flag-mount bracket 1310 in use, illustrating flag-receiver arm 160 with an extended-static section 1320, according to the preferred embodiment of FIG. 12. FIG. 14 shows a side view of the flag-mount bracket illustrating flag-mount bracket system in an out of use position and how flag-mount bracket 1310 rotates to "swing" around the eaves 1210 of the structure, according to the preferred embodiment of FIG. 13.

Flag-mount bracket 1310 preferably comprises an extended-static section 1320 which allows flag-mount bracket 1310 to be mounted on the inside of the eaves 1210 of a structure and hidden from view (at least embodying herein at least one eaves-retractor structured and arranged to retract said at least one flag-pole receiver under at least one roof eaves when in such lowered position; and at least herein embodying wherein said at least one flag-pole receiver comprises at least one under-eaves configuration structured and arranged to retract under eaves of a roof when rotated down; and at least embodying herein eaves-retractor means for retracting said flag-pole receiver means under at least one roof eaves when in such lowered position), as shown. Extended static-section 1320 comprises preferably comprises a shape, preferably squared U-shape. Upon reading the teachings of this specification, those skilled in the art will now appreciate that, under appropriate circumstances, considering such issues as user preference, manufacturing preference, materials, etc., other shapes, such as, for example, rounded U-shape, V shape, etc., may suffice. The extended U-shape of extended-static section 1320 allows flag-receiver arm 160 to "swing" around the eaves 1210 of the structure when flag 107 is posted into it and raised by the user to a flying position. The present embodiment allows for flag-mount bracket 1310 to be hidden from view both in the raised and lowered positions behind the eaves 1210 of a structure, as shown.

Figure 15:
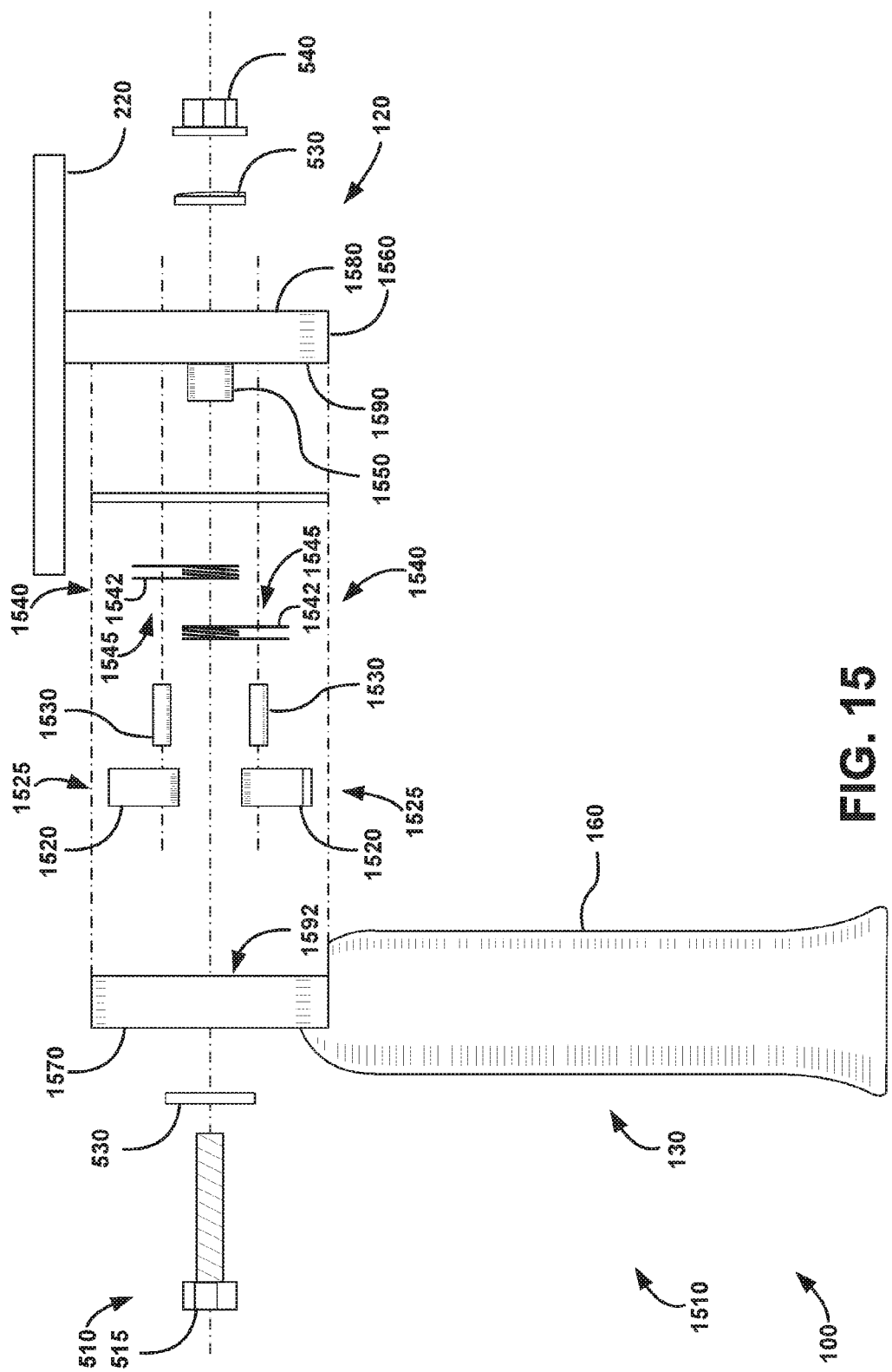
FIG. 15 shows an exploded side view of the flag-mount bracket of flag-mount bracket system, according to an alternately preferred embodiment of the present invention.
Figure 16:
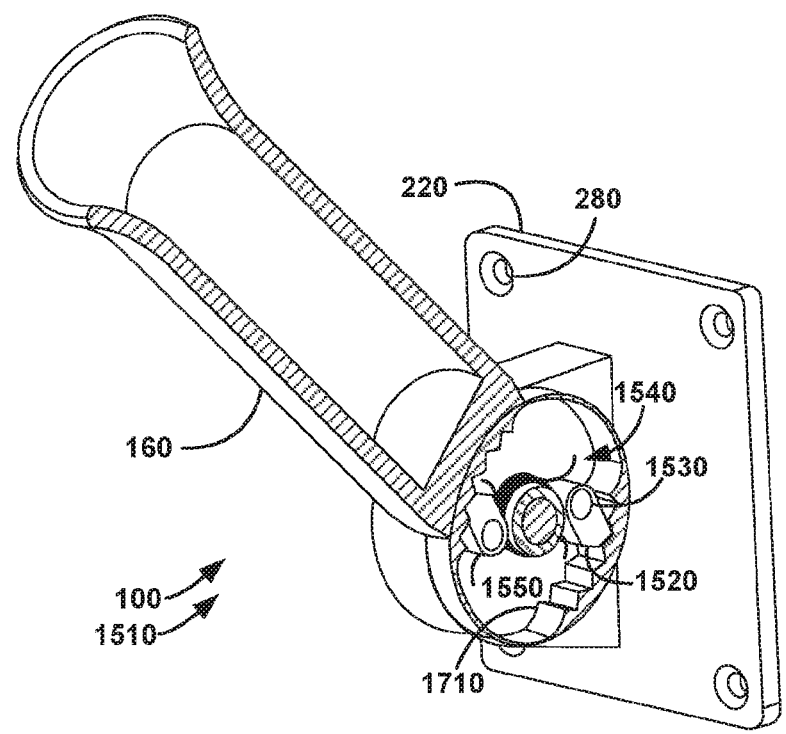
FIG. 16 shows a partial cutaway view of the flag-mount bracket, according to the preferred embodiment of FIG. 15.
Figure 17:
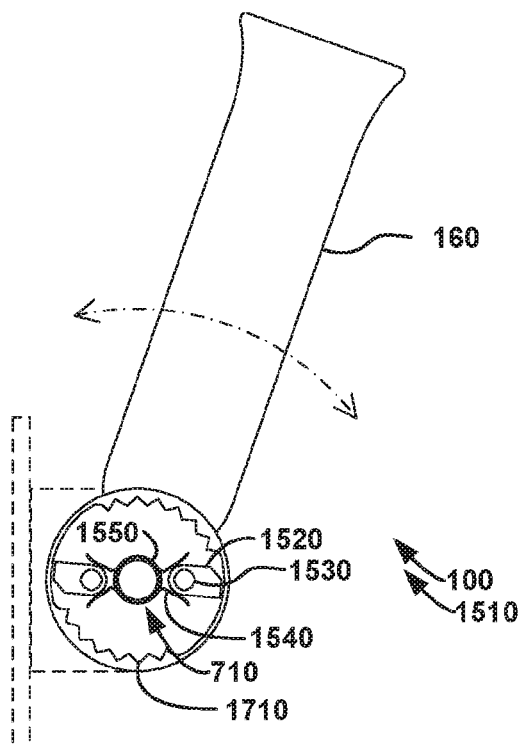
FIG. 17 shows a side view of the flag-arm portion in the "neutral" position, according to the preferred embodiment of FIG. 16.
Figure 18:
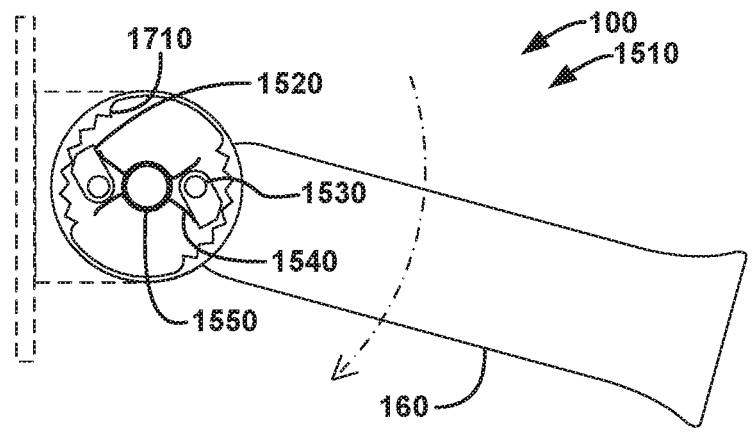
FIG. 18 shows a side view of the flag-arm portion in the "lowering" position, according to the preferred embodiment of FIG. 16.
Figure 19:
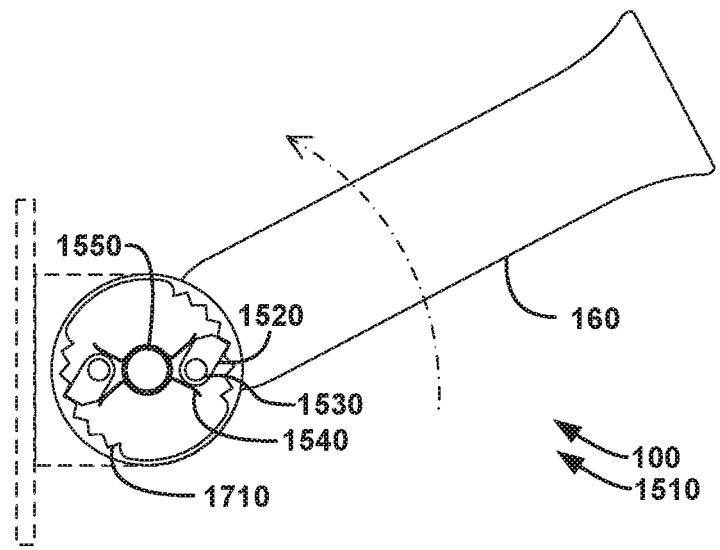
FIG. 19 shows a side view of the flag-arm portion in the "raising" position, according to the preferred embodiment of FIG. 16.
Figure 21:
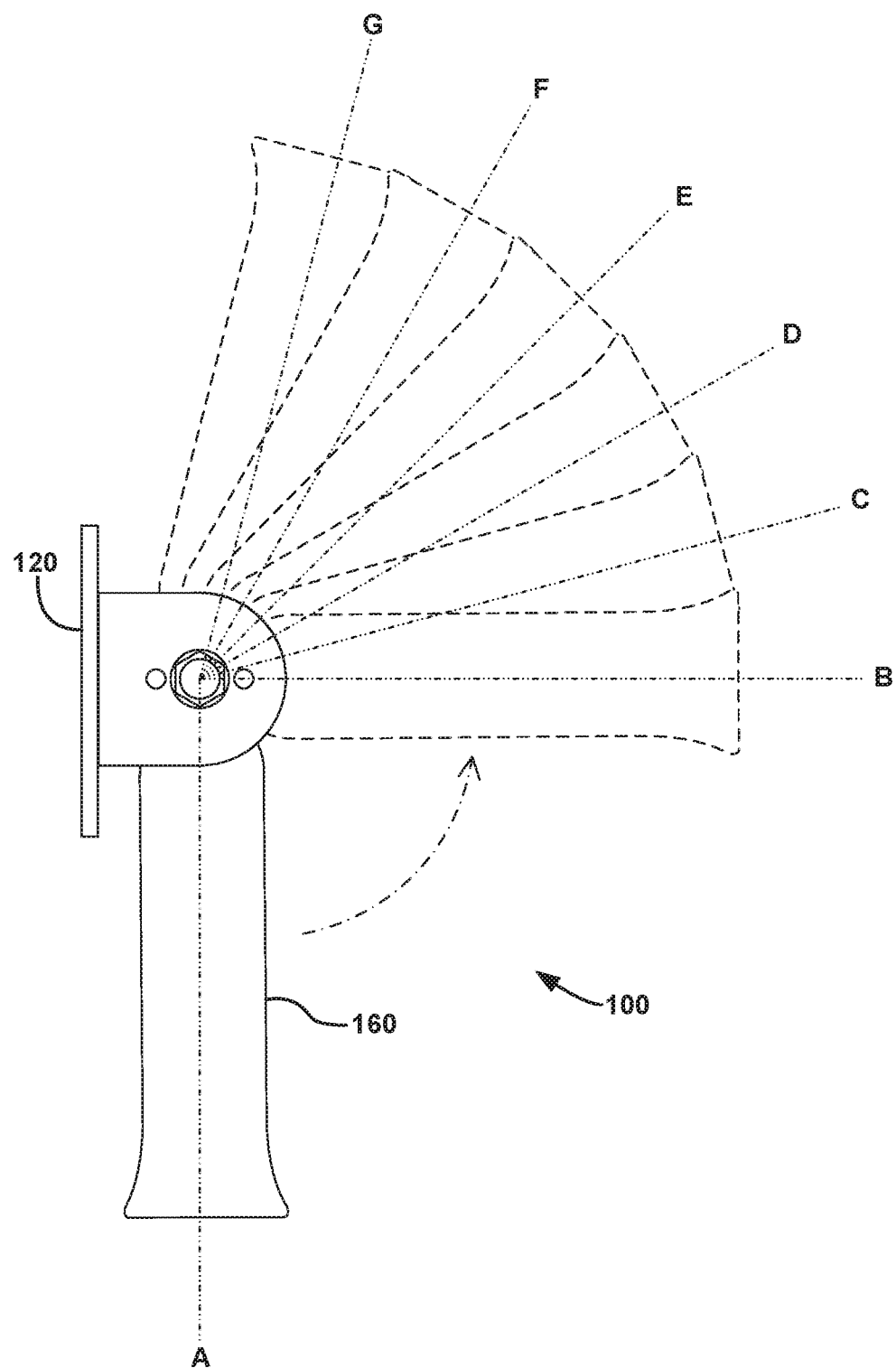
FIG. 21 shows a side view of the flag-mount bracket, illustrating the various different locked positions, according to the preferred embodiment of FIG. 16.

FIG. 15 shows an exploded side view of the flag-mount bracket 1510 of flag-mount bracket system 100, according to an alternately preferred embodiment of the present invention. FIG. 16 shows a partial cutaway view of the flag-mount bracket 1510, according to the preferred embodiment of FIG. 15. FIG. 17 shows a side view of the flag-arm portion 130 in the "neutral" position, according to the preferred embodiment of FIG. 16. FIG. 18 shows a side view of the flag-arm portion 130 in the "lowering" position, according to the preferred embodiment of FIG. 16. FIG. 19 shows a side view of the flag-arm portion 130 in the "raising" position, according to the preferred embodiment of FIG. 16. FIG. 20 shows a perspective view of flag-arm portion 130 of flag-mount bracket 110 depicting flag-securing stopper 2010 on the flag pole, according to a preferred embodiment of FIG. 15. FIG. 21 shows a side view of the flag-mount bracket, illustrating the various different locking positions, according to the preferred embodiment of FIG. 16.

FIG. 15 shows an exploded view of flag-mount bracket 1510 of flag-mount bracket system 100. Many of the features of flag-mount bracket 1510 are repeated from flag-mount bracket 110, as shown. Flag-mount bracket 1510 preferably comprises at least one bracket-mount portion 120 and at least one flag-arm portion 130, as shown. However, the flag mount locking mechanism differs in flag-mount bracket 1510 (at least herein embodying wherein said at least one flag pole coupler comprises at least one rotation restricting geometry structured and arranged to restrict rotation of said at least one flag pole coupler about a longitudinal axis) from flag-mount bracket 110, as shown.

Bracket-mount portion 120 preferably comprises at least one bracket-mount-plate portion 220 and at least one flag-arm-attacher portion 1560, as shown. Flag-arm-attacher portion 1560 is attached to bracket-mount-plate portion 220 in the same manner described above, as shown.

Flag-arm-attacher portion 1560 preferably comprises outer face 1580 and inner face 1590, as shown. Both outer face 1580 and inner face 1590 of flag-arm-attacher portion 1560 comprise a flat surface. Flag-arm-attacher portion 1560 preferably comprises hole 710 extending through flag-armattacher portion 1560 from inner face 1590 to outer face 1580 (same hole 710 as in flag-arm-attacher portion 230 of bracket-mount mount portion 120 of flag-mount bracket 110) in the center of flag-attacher portion 1560 (see FIG. 17). Flag-arm-attacher portion 1560 preferably further comprises at least one pawl-pin hole 1610 (see FIG. 25), at least two pawl-pin holes 1610 adjacent either side of hole 710 which allow pawl-pins 1530 (discussed below) to be secured into inner face 1590 of flag-arm-attacher portion 1560.

Flag-arm-attacher portion 1560 preferably comprises at least one spring receiver 1550. Flag-arm-attacher portion 1560 preferably further comprises at least one position-lock assister 1545. Position-lock assister 1545 preferably comprises at least one spring 1540, preferably at least one coiled spring, preferably at least one coiled pawl-spring 1542, preferably at least two coiled pawl-springs 1542, as shown. Spring receiver 1550 preferably comprises cylindrical tube which allows spring receiver 1550 to accept coiled pawl-springs 1542 with an interior circumference which is equal to the circumference of hole 710 (see FIG. 17). The at least one coiled pawl-spring 1542, preferably assist in locking flag-mount bracket 1510 at various stop-lock positions (see FIGS. 17-19). Coiled pawl-springs 1542 preferably comprise an internal circumference which is slightly larger than the exterior circumference of spring receiver 1550 allowing coiled pawl-springs 1542 to slide over spring receiver 1550 (see FIG. 16). Coiled pawl-springs 1542 are preferably mirror images of each other, such that they are coiled in opposite directions, as shown. Coiled pawl-springs 1542 preferably comprise tails (or a length of wire which extends outside of the coil) both on the coil beginning side as well as the coil terminating side, as shown.

Flag-arm-attacher portion 1560 preferably comprises at least one position maintainer 1525. Position maintainer 1525 preferably comprises at least one pawl 1520, preferably at least two pawls 1520. Pawls 1520 engage ratchet teeth 1710 of bracket-attacher end 1570 of flag-arm portion 130 as discussed below (see FIG. 16). Pawl 1520 preferably comprises a shape. Preferably one end comprises a rounded edge to allow for pawl 1520 to easily rotate around pawl-pin 1530. Preferably the other end comprises one right-angled corner to allow pawl 1520 to "lock" into the ratchet teeth 1710 of bracket-attacher end 1570 during the raising function of flag-mount bracket 1510; and one beveled corner to allow pawl 1520 to "slide" over the ratchet teeth 1710 during the lowering function of flag-mount bracket 1510.

Flag-arm-attacher portion 1560 preferably further comprises at least one pawl-pin 1530, preferably at least two pawl-pins 1530 which secure pawls 1520 in a rotational manner to flag-arm-attacher portion 1560, as shown.

Bracket-attacher end 1570 of flag-arm portion 130 preferably comprises at least one shape, preferably circular shape structured and arranged to fit onto the circular end of flag-arm-attacher portion 1560 of bracket-mount portion 120. In the present embodiment of flag-mount bracket system 100, bracket-attacher end 1570 of flag-arm portion 130 is preferably hollowed to form inner chamber 1592. Inner chamber 1592 is preferably structured and arranged to allow for a set of ratchet teeth 1710 to be contained within bracket-attacher end 1570 (see FIG. 16).

Inner chamber 1592 preferably comprises at least one set of ratchet teeth 1710, preferably at least two sets of ratchet teeth 1710 which engage pawls 1520 of flag-arm-attacher portion to "lock" flag-mount bracket in place at a given stop-lock position Q. One set of ratchet teeth 1710 is preferably located (within inner chamber 1592) directly behind bracket-attacher end 150 of flag-receiver arm 160, and the other set of ratchet teeth 1710 is preferably located (within inner chamber 1592) directly on the other side of spring receiver 1550 (see FIG. 16). Inner chamber 1592 preferably comprises a smooth inner surface between each set of ratchet teeth 1710 (see FIG. 17). When pawls 1520 are positioned within these areas between the sets of ratchet teeth 1710, flag-mount bracket 1510 is in the "neutral position", from which it can be either raised or lowered (see FIG. 17).

FIG. 18 illustrates flag mount-bracket 1510 in a "lowering position". In this position, pawls 1520 are preferably disengaged and rotated such that the beveled edge is facing the ratchet teeth 1710 allowing them to slide over the ratchet teeth 1710 as opposed to engaging them (at least herein embodying wherein said at least one rotational hinge joint comprises at least one position releaser structured and arranged to release a maintained position through the application of a tangential force applied to said at least one rotational hinge joint through said at least one mount receiver portion). Conversely, FIG. 19 illustrates flag-mount bracket 1510 in a "raising position". In this position, pawls 1520 are preferably rotated such that the 90 degree angled corner is facing the ratcheting teeth. As the flag-mount bracket is pushed upward, the pawl will slide up each ratchet tooth 1710, click over it and then engage or "lock" into the groove between ratchet teeth 1710.

Each set of ratchet teeth 1710 preferably comprise six sets of alternating teeth and grooves, creating six different stop-lock positions B-G (at least herein embodying wherein said at least one rotational hinge joint comprises at least three positions of said at least one mount receiver portion that can be maintained by said at least one rotational hinge joint) (see FIG. 21). Stop-lock positions B-G are located in 15 degree increments (at least herein embodying wherein said at least three positions comprise 15 degree intervals). Position A is the "posting" position in which the flag-receiver arm is pointed directly downward at zero degrees.

FIG. 21 shows a side view of flag-mount bracket 1510 illustrating the various possible stop-lock positions. As discussed above, position A (at least herein embodying wherein said at least three positions comprise a full mast raised position of the at least one flag, a half mast raised position of the at least one flag, and a lowered position of the at least one flag; and at least herein embodying wherein such rotation comprises a lowered position of the at least one flag) comprises the "posting" or flag insertion position at zero degrees. Position B (at least herein embodying wherein said at least one connector comprises at least one rotation permitter structured and arranged to permit rotation of said at least one flag-pole receiver of at least 90 degrees; and at least herein embodying wherein said at least one coupler permits rotation of said at least one flag-pole receiver with respect to said at least one surface mount over at least a range of 90 degrees; and at least herein embodying wherein said connector means comprises rotation permitter means for permitting rotation of said flag-pole receiver of at least 90 degrees; and at least herein embodying wherein such rotation comprises a half-mast raised position of the at least one flag) comprises a horizontal position which is considered to be the "half-mast" position, located at 90 degrees from vertical. Position C and D are each located 15 degrees further toward vertical respectively from position B and each other. Position E (at least herein embodying wherein such rotation comprises a full-mast raised position of the at least one flag) comprises a 45 degree angle from horizontal (position B) and is considered to be the "full mast" position.

Positions F and G are each located 15 degrees further toward vertical respectively from position E and each other.

Flag-mount bracket 1510 is preferably assembled in a similar manner as flag-mount bracket 110. Each pawl-pin 1530 is inserted into each pawl-pin hole 1610 (not shown); and each pawl 1520 is attached to each pawl-pin 1530. Each coiled pawl-spring 1542 is placed onto spring receiver 1550, one on top of the other in such a manner that each coiled pawl-spring 1542 is coiled in the opposite direction of the other. Bolt 510 is preferably placed through washer 530, through bracket-attacher end 1570, through the hole in the center of spring-receiver 1550 and hole 710, through flag-arm-attacher portion 1560 and through another washer 530. Nut 540 is then tightened to secure the assembly together.

Figure 22:
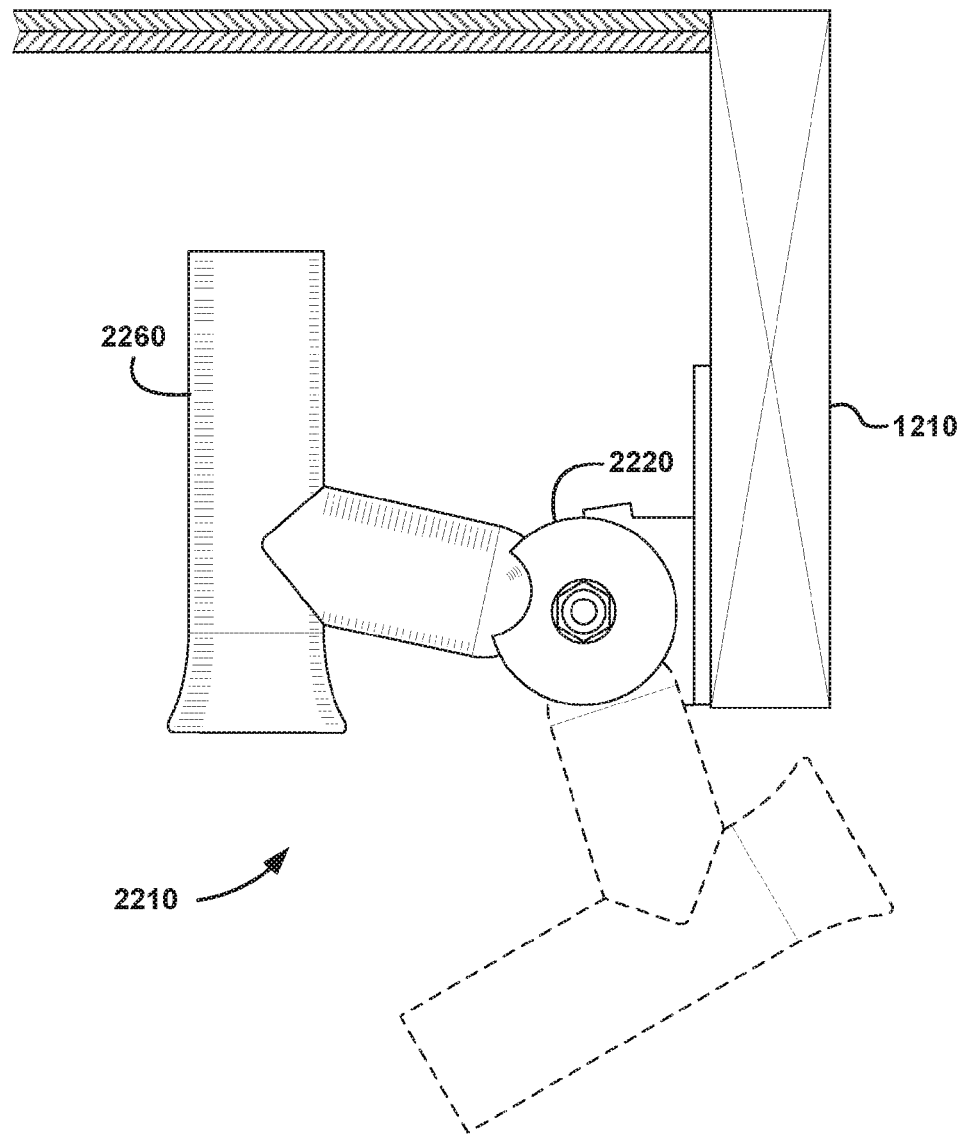
FIG. 22 shows the flag-arm portion in a "T" configuration, to allow flag-mount bracket to be mounted on the inside of the eaves of a structure, according to an alternately preferred embodiment of the present invention.

FIG. 22 shows the flag-arm portion 2260 in a "T" configuration, to allow flag-mount bracket 2210 to be mounted on the inside of the eaves 1210 of a structure, according to an alternately preferred embodiment of the present invention. Flag-mount bracket 2210 preferably comprises bracket-mount portion 2220 and flag-arm portion 2260. Flag-arm portion 2260 preferably comprises cylindrical tube in a "T-shaped" configuration structured and arranged to allow flag-mount bracket 2210 to be hidden from view when not in use. When flag-mount bracket 2210 is in use, only flag 107 will be visible.

Figure 23:
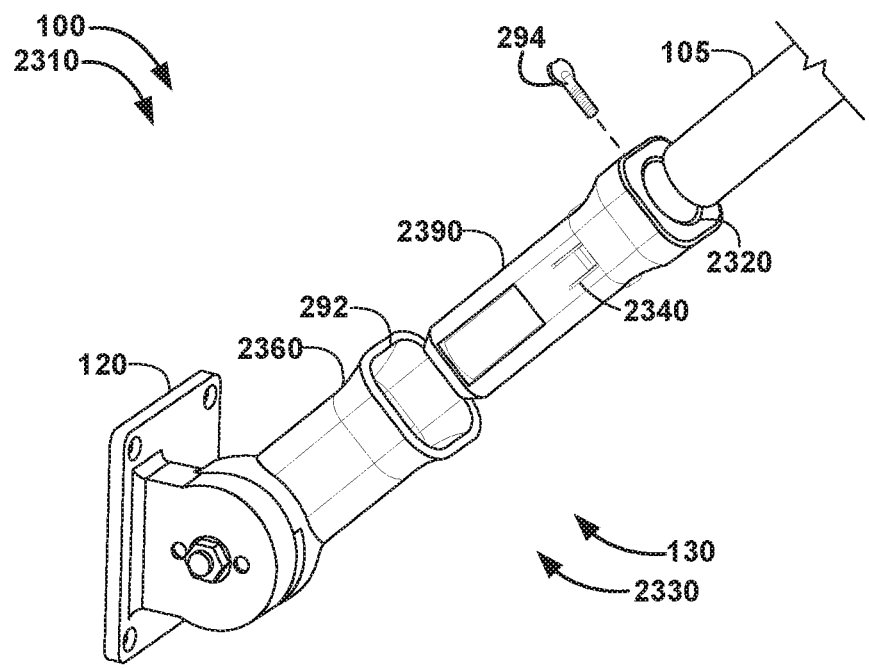
FIG. 23 shows an exploded side perspective view of the flag-mount bracket system, according to an alternately preferred embodiment of the present invention.

FIG. 23 shows an exploded side perspective view of the flag-mount bracket system 100, according to an alternately preferred embodiment of the present invention. Many of the features of flag-mount bracket 2310 are repeated from flag-mount bracket 110, as shown. Flag-mount bracket 2310 preferably comprises at least one bracket-mount portion 120 and at least one flag-arm portion 130 (at least herein embodying wherein said flag-pole mount comprises a receiver structured and arranged to receive said coupler, and a hinged joint structured and arranged to hingedly join said receiver to said flag-pole mount), as shown. However, the flag-arm portion 2330 of flag-mount bracket 2310 differs from flag-arm portion 130 of flag-mount bracket 110 in that flag-arm portion 2330 comprises a rounded square shape as opposed to a cylindrical shape (at least herein embodying wherein said at least one rotation restricting geometry comprises a cross-section perpendicular to a longitudinal axis; and wherein said cross-section comprises at least one deviation from round), as shown.

Flag-arm portion 2330 preferably comprises flag-receiver arm 2360, as shown. Flag-arm portion 2330 preferably comprises flag-securing-sheath adapter 2390. Flag-securing-sheath adapter 2390 preferably differs from flag-securing sheath 290 in that flag-securing-sheath adapter 2390 comprises pliable-metal-engaging material, preferably aluminum, alternately preferably plastic, alternately preferably silicone. Upon reading the teachings of this specification, those skilled in the art will now appreciate that, under appropriate circumstances, considering such issues as user preference, cost, available materials, new technology, etc., other materials, such as, for example, pot metal, die cast metal, steel, other metals, polyurethane, polypropylene, polyethylene, other plastics, etc., may suffice. Flag-receiver arm 2360 preferably comprises rounded square tube, as shown. Flag-receiver end 292 of flag-receiver arm 2360 preferably comprises a flared construction such that flag-receiver arm 2360 comprises a "trumpet-like" shape which allows for easier insertion of a flag pole into flag-mount bracket 2310, as shown. Flag-securing-sheath adapter 2390 preferably allows for adaptation from the rounded square shape of flag-receiver arm 2360 to fit the circular shape of flag pole 105 of flag 107, as shown. Flag-securing-sheath adapter preferably fits inside flag-receiver arm 2360 to allow for a secure posting of flag 107, as shown. Additionally, flag-securing-sheath adapter 2390 preferably comprises adapter-flag receiver 2320, as shown. Adapter-flag receiver 2320 preferably comprises a circular opening which preferably allows for insertion of a variety of flag pole sizes, preferably a range of flag pole sizes, preferably flag poles ranging from ¾-inch to one inch in diameter. Upon reading the teachings of this specification, those with ordinary skill in the art will now appreciate that, under appropriate circumstances, considering such issues as user preference, cost, available materials, new technology, etc., other flag pole diameters, such as, for example, 1½ inch, diameters which fall between 1 inch and 1½ inch, diameters less than ¾ inch, larger diameters, etc., may suffice.

The end of flag pole 105, opposite the end where flag 107 is attached, is placed inside flag-securing-sheath adapter 2390 through adapter-flag receiver 2320. Flag-securing-sheath adapter 2390 preferably further comprises at least one fastener 294, preferably at least one flag-securing fastener, preferably a set-screw which screws into flag pole 105 to secure flag-securing-sheath adapter 2390 onto flag pole 105, as shown.

Flag-securing-sheath adapter 2390 preferably further comprises at least one adapter-securing tab 2340, preferably at least two adapter-securing tabs 2340 on at least two sides of flag-securing-sheath adapter 2390, as shown. When flag-securing-sheath adapter 2390 is inserted into flag-receiver arm 2360 of flag-arm portion 2330, adapter-securing tabs 2340 preferably engage adapter-locking grooves 2365 (not shown) inside of flag-receiver arm 2360, to lock flag-securing-sheath adapter 2390 into flag-receiver arm 2360. Applicant has found through experimentation and testing that the locking mechanism of adapter-securing tabs 2340 engaging adapter-locking grooves 2365 (not shown) within flag-receiver arm 2360 results in a drastically reduced chance of flag pole 105 accidently slipping out of flag-mount bracket 2310, should it be accidently disengaged and fall to the flag loading position A (see FIG. 21).

Figure 24:
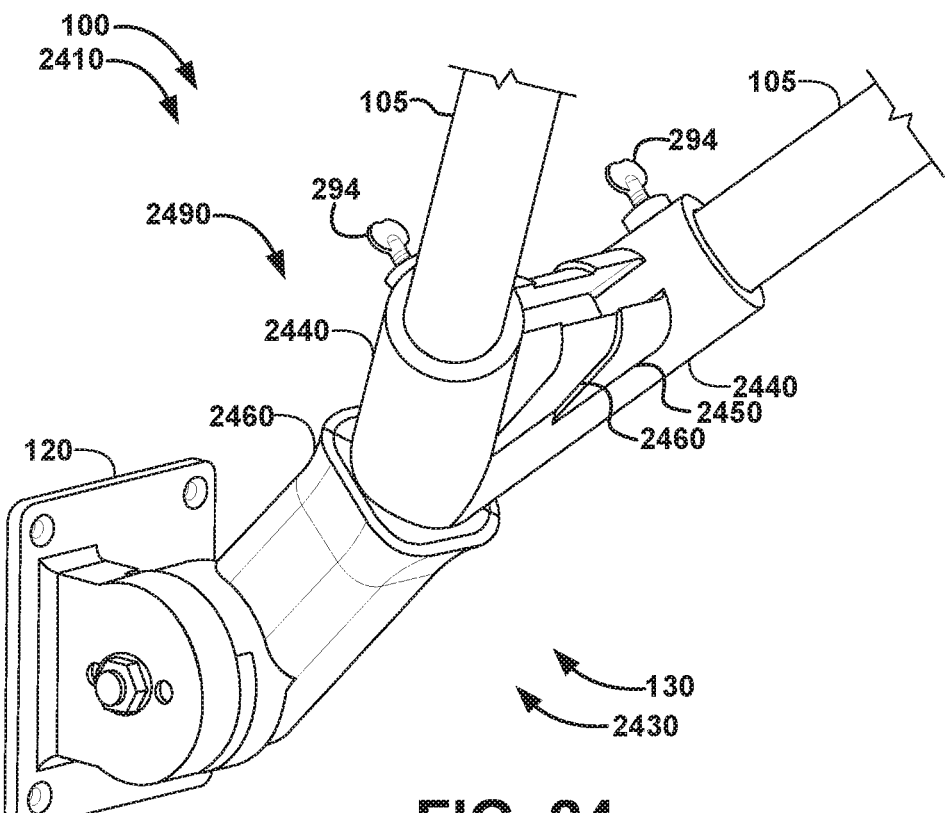
FIG. 24 shows a perspective view of Flag Mount Bracket System, according to an alternately preferred embodiment of the present invention.

FIG. 24 shows a perspective view of Flag Mount Bracket System, according to an alternately preferred embodiment of the present invention. Many of the features of flag-mount bracket 2410 are repeated from flag-mount bracket 2310, as shown. Flag-mount bracket 2410 preferably comprises at least one bracket-mount portion 120 and at least one flag-arm portion 2430. Flag-arm portion 2430 preferably comprises flag-receiver arm 2360 and at least one flag-securing-sheath adapter 2490. Flag-securing-sheath adapter 2490 preferably comprises bracket-mount end (not shown), which comprises the rounded square shape similar to flag-securing-sheath adapter 2390, and at least one sheath-adapter arm 2440, preferably at least two sheath-adapter arms 2440 (at least herein embodying wherein said at least one flag pole portion comprises at least two flag pole receivers each structured and arranged to receive such at least one flag pole simultaneously; and at least embodying herein a flag-pole mount structured and arranged to mount two flag poles onto a substantially vertical surface; and at least embodying herein a coupler structured and arranged to couple two flag poles to said flag-pole mount), which allows for the ability to mount two flags 107 into flag-mount bracket 2410.

Figure 28B:
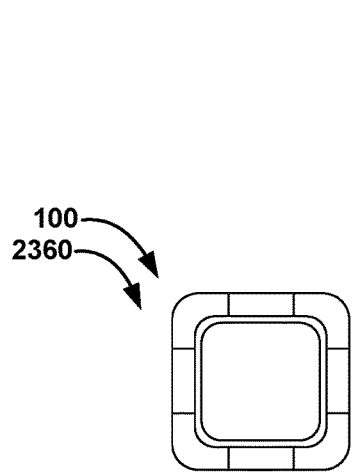
FIG. 28B shows the sectional view 28-28 of FIG. 28A according to the preferred embodiment of FIG. 24.
Figure 28A:
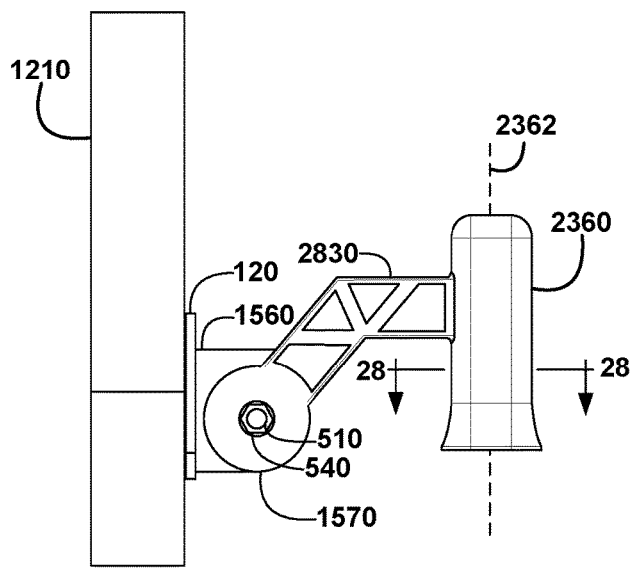
FIG. 28A shows a side view of Flag Mount Bracket System, showing the flag-arm portion in an "angled" or "wide V" configuration, to allow flag-mount bracket to be mounted on the inside of the eaves of a structure, in the "loading" position, according to an alternately preferred embodiment of the present invention.

FIG. 28B shows the sectional view 28-28 of FIG. 28A according to the preferred embodiment of FIG. 24. Applicant has recognized that if flag-mount bracket 2410 comprises flag-arm portion 2430 with a cylindrical shape, there would occur significant rotation of the two flag poles 105. This would especially occur if there were a significant amount of wind. Therefore, the preferred embodiment of flag-mount bracket 2410 preferably comprises flag-arm receiver 2440 which preferably comprises the same rounded square shape (at least herein embodying wherein said at least one rotation restricting geometry comprises a squared cross-section) as flag-receiver arm 2360 of flag-mount bracket 2310. Flag-arm receiver 2440 preferably accommodates the rounded square shape of flag-securing-sheath adapter 2490 of flag-mount bracket 2410. The rounded square shape of the preferred embodiment of flag-mount bracket 2410 preferably prevents rotation of the flags 107 about a longitudinal axis 2362, when there are two flags mounted in flag-mount bracket 2410 (at least herein embodying wherein said coupler linearly inserts into said receiver, and couples and decouples with said receiver using a force, upon said coupler, linear to the direction of insertion; wherein said coupler and said receiver comprise a spin restricting geometry structured and arranged to restrict spinning of said coupler in said receiver; and at least herein embodying wherein said spin restricting geometry comprises a cross-section perpendicular to a longitudinal axis; and wherein said cross-section comprises at least one deviation from round; and at least herein embodying wherein said spin restricting geometry comprises a squared cross-section), as shown.

Flag-securing-sheath adapter 2490 preferably further comprises dual-flag-support gusset 2450, as shown. Dual-flag-support gusset 2450 preferably comprises triangular shaped gusset between the two sheath-adapter arms 2440, as shown. Dual-flag-support gusset 2450 preferably provides for the sheath-adapter arms 2440 to be separated by a roughly 60 degree angle, and provides for the sheath-adapter arms 2440 to be held rigidly in place, as shown. Additionally, dual-flag-support gusset 2450 preferably comprises flag-lowering stabilization groove 2460. Flag-lowering stabilization groove 2460 of dual-flag-support gusset 2450 is preferably structured such that a claw arm 3090 of grabber claw 3020 will fit within it (described below).

Sheath-adapter arms 2440 preferably comprise a cylindrical sheath shape which is preferably large enough to allow flag poles 105 to slide into sheath-adapter arms 2440. Flag pole 105 is then secured in place within the sheath-adapter arms 2440 with fastener 294. The rigid dual-flag-support gusset 2450 and the rounded square shape of flag-securing-sheath adapter 2490 are instrumental in preventing any rotation of flags 107 when mounted in flag-mount bracket 2410.

Figure 25:
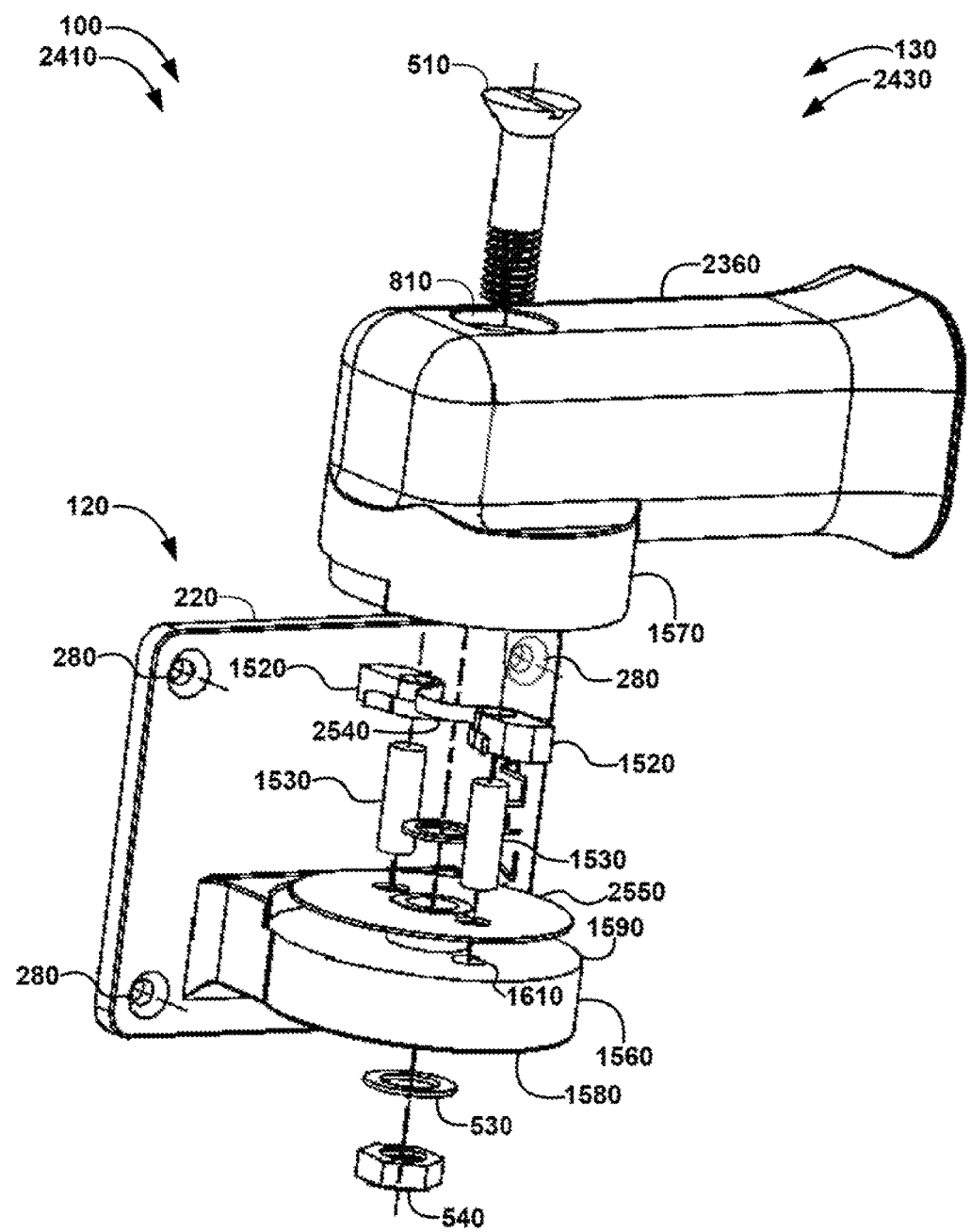
FIG. 25 shows an exploded side perspective view of the flag-mount bracket of flag-mount bracket system, according to the preferred embodiment of FIG. 23.

FIG. 25 shows an exploded side perspective view of the flag-mount bracket 2410 of flag-mount bracket system 100, according to the preferred embodiment of FIG. 24. Many of the features of flag-mount bracket 2410 are repeated from flag-mount bracket 110, as shown. Flag-mount bracket 2410 preferably comprises at least one bracket-mount portion 120 and at least one flag-arm portion 2430, as shown. The flag-mount locking mechanism in flag-mount bracket 2410 is similar to the flag mount-locking mechanism of flag-mount bracket 1510, as shown.

Bracket-mount portion 120 preferably comprises at least one bracket-mount-plate portion 220 and at least one flag-arm-attacher portion 1560, as shown. Flag-arm-attacher portion 1560 is attached to bracket-mount-plate portion 220 in the same manner described above for bracket-mount-plate portion 220 of flag-mount bracket 110, as shown.

Flag-arm-attacher portion 1560 preferably comprises outer face 1580 and inner face 1590, as shown. Both outer face 1580 and inner face 1590 of flag-arm-attacher portion comprise a flat surface. Flag-arm-attacher portion 1560 preferably comprises hole 710 extending through flag-arm-attacher portion 1560 from inner face 1590 to outer face 1580 (same hole 710 as in flag-arm-attacher portion 230 of bracket-mount mount portion 120 of flag-mount bracket 110) in the center of flag-arm-attacher portion 1560 (see FIG. 17). Flag-arm-attacher portion 1560 preferably further comprises at least one pawl-pin hole 1610, preferably at least two pawl-pin holes 1610 adjacent either side of hole 710 which allows pawl-pins 1530 (discussed below) to be secured into inner face 1590 of flag-arm-attacher portion 1560.

Flag-arm-attacher portion 1560 preferably further comprises at least one spring receiver 1550 (see FIG. 15) which preferably allows it to receive at least one spring 1540. Spring receiver preferably comprises cylindrical tube shaped as such, in order for pawl-springs 2540 to easily slide over the outside of spring receiver 1550. Spring receiver 1550 preferably comprises an exterior circumference which is substantially equal to the circumference of hole 710, as shown. Flag-arm-attacher portion 1560 preferably further comprises at least one spring 1540, preferably at least one pawl-spring 2540, preferably at least two pawl-springs 2540, as shown. Pawl-springs 2540 preferably comprise an internal circumference which is slightly larger than the exterior circumference of pawl-spring receiver 1550 allowing pawl-springs 2540 to slide over pawl-spring receiver 1550 (see FIG. 16). Pawl-springs 2540 are preferably mirror images of each other similar to the pawl-springs 1540, however, pawl-springs 2540 differ from pawl-springs 1540 in that they are leaf springs preferably comprising a "handle-bar mustache" shape rather than coiled. Pawl-springs 2540 preferably comprise tails (or the "handle bars" of the "handle bar mustache" shape which extend outward from the arced portion which fits over spring receiver 1550) on both sides, as shown.

Flag-arm-attacher portion 1560 preferably comprises at least one pawl 1520, preferably at least two pawls 1520 which engage the ratchet teeth 1710 of bracket-attacher end 1570 of flag-arm portion 130 as discussed below (see FIG. 16). Pawl 1520 preferably comprises a shape. Preferably one end comprises a rounded edge to allow for pawl 1520 to easily rotate around pawl-pin 1530. Preferably the other end comprises one right-angled corner to allow pawl 1520 to "lock" into the ratchet teeth 1710 of bracket-attacher end 1570 during the raising function of flag-mount bracket 1510; and one beveled corner to allow pawl 1520 to "slide" over the ratchet teeth 1710 during the lowering function of flag-mount bracket 1510 (at least herein embodying wherein said rotation of said at least one rotational hinge joint comprises a unidirectional rotation from said lowered position, through said half-mast raised position and through said full-mast raised position, and comprises an opposite unidirectional rotation from past said full-mast raised position to said lowered position; and at least herein embodying wherein rotation past said full-mast raised position reverses directionality of rotation). Flag-arm-attacher portion 1560 preferably further comprises at least one pawl-pin 1530, preferably at least two pawl-pins 1530 for securing the pawls 1520 in a rotational manner to flag-arm-attacher portion 1560, as shown.

Bracket-attacher end 1570 of flag-arm portion 2430 preferably comprises at least one shape, preferably circular shape which fits onto the circular end of flag-arm-attacher portion 1560 of bracket-mount portion 120. In the present embodiment of flag-mount bracket system 100, bracket-attacher end 1570 of bracket-mount portion 120 is preferably hollowed to form inner chamber 1592 (see FIG. 16). Inner chamber 1592 is preferably structured and arranged to allow for a set of ratchet teeth 1710 to be contained within bracket-attacher end 1570 (see FIG. 16).

Inner chamber 1592 preferably comprises at least one set of ratchet teeth 1710, preferably at least two sets of ratchet teeth 1710 which are designed to engage pawls 1520 of flag-arm-attacher portion to "lock" flag-mount bracket in place at a given stop-lock position (at least herein embodying wherein said hinged joint comprises a directional ratchet allowing unidirectional rotation until reaching a maximum rotation where the direction of allowed rotation is reversed; and at least herein embodying wherein said hinged joint comprises at least two positions that are maintained by said hinged joint against gravity). One set of ratchet teeth 1710 is preferably located (within inner chamber 1592) directly behind bracket-attacher end 150 of flag-receiver arm 2360, and the other set of ratchet teeth 1710 is preferably located (within inner chamber 1592) directly on the other side of spring receiver 1550 (see FIG. 16). Inner chamber 1592 preferably comprises a smooth inner surface between each set of ratchet teeth 1710 (see FIG. 17). When pawls 1520 are located within these areas between the sets of ratchet teeth 1710, flag-mount bracket 2410 is in the "neutral position", from which it can be either raised or lowered (see FIG. 17).

Flag-mount bracket 2410 preferably further comprises bracket-securing-washer 2550, as shown. Bracket securing washer 2550 preferably allows for a tighter, more secure seal between bracket-mount portion 120 and flag-arm portion 130, as well as aides in preventing adverse effects of weather to the interior of flag-mount bracket 2410. Flag-mount bracket 2410, once fully assembled, functions in the same manner in relation to the raising and lowering of a flag as flag-mount bracket 1510.

Figure 27:
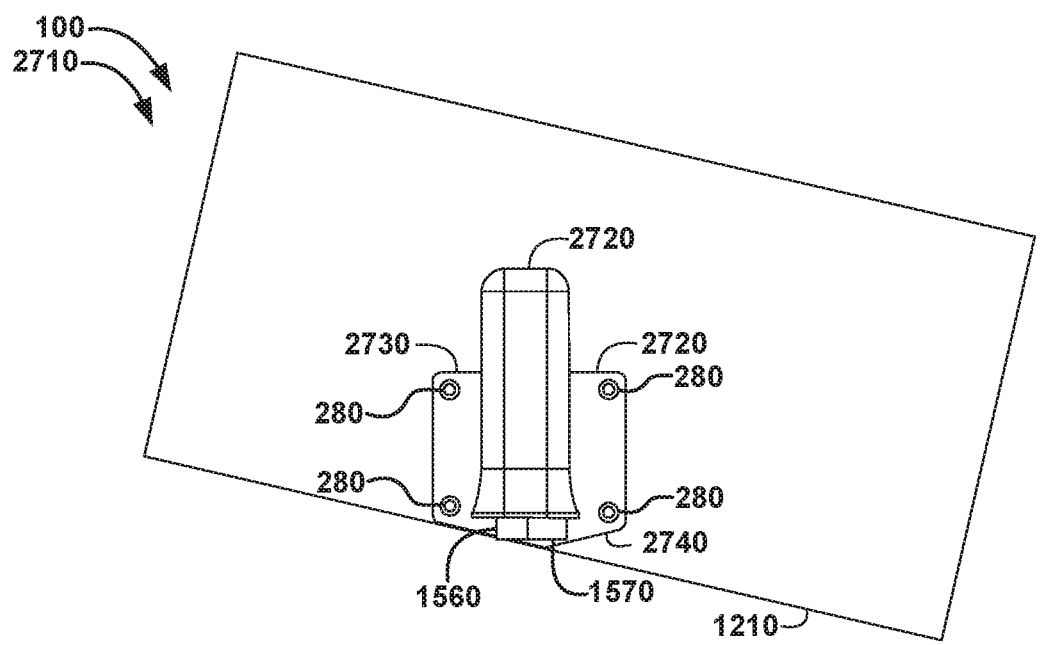
FIG. 27 shows a front view of Flag Mount Bracket System mounted on the eaves with an alternate angled mounting plate, according to the preferred embodiment of FIG. 23.
Figure 26:
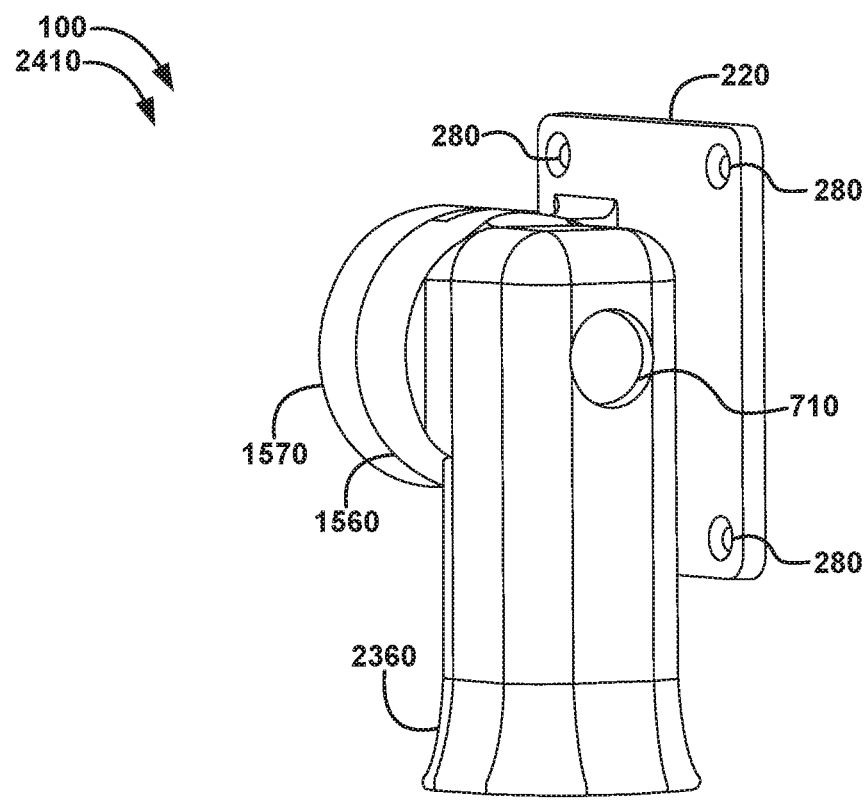
FIG. 26 shows a side perspective view of Flag Mount Bracket System, according to the preferred embodiment of FIG. 24.

FIG. 26 shows a side perspective view of Flag Mount Bracket System 100, according to the preferred embodiment of FIG. 24. In FIG. 26, flag-mount bracket 2410 of flag-mount bracket system 100 is fully assembled, and is shown in the "loading" position, where it is ready for receiving a flag-securing-sheath adapter 2390 (or flag-securing-sheath adapter 2490 if flying two flags is desired) mounted to flag pole 105 of flag 107. FIG. 27 shows a front view of flag-mount bracket 2710 (at least embodying herein at least one eaves-retractor structured and arranged to retract said at least one flag-pole receiver under at least one roof eaves when in such lowered position) of flag mount bracket system 100, mounted to the eaves of a structure, according to an alternately preferred embodiment of the present invention. Many of the features of flag-mount bracket 2710 are repeated from flag-mount bracket 1310, as shown. Flag-mount bracket 2710 preferably comprises at least one bracket-mount portion 120 and at least one flag-arm portion 2830, as shown. However, the bracket-mount-plate portion 2720 differs from the bracket-mount-plate portion 220 of flag-mount bracket 110 in that bracket-mount-plate portion 2720 is not square in shape, as shown. Bracket-mount-plate portion 2720 preferably comprises a top portion 2730 and a bottom portion 2740, as shown. Top portion 2730 preferably comprises a straight edge which is at right angles to the sides of bracket mount plate portion 2720 as shown. Bottom portion 2740 preferably comprises an "angled" or "wide V" configured edge which allows for flag-mount bracket to be mounted onto an angled eave (like on an "A"-frame or peaked roofline) and still have the flag 107 or flags 107 fly straight, as shown.

Figure 29:
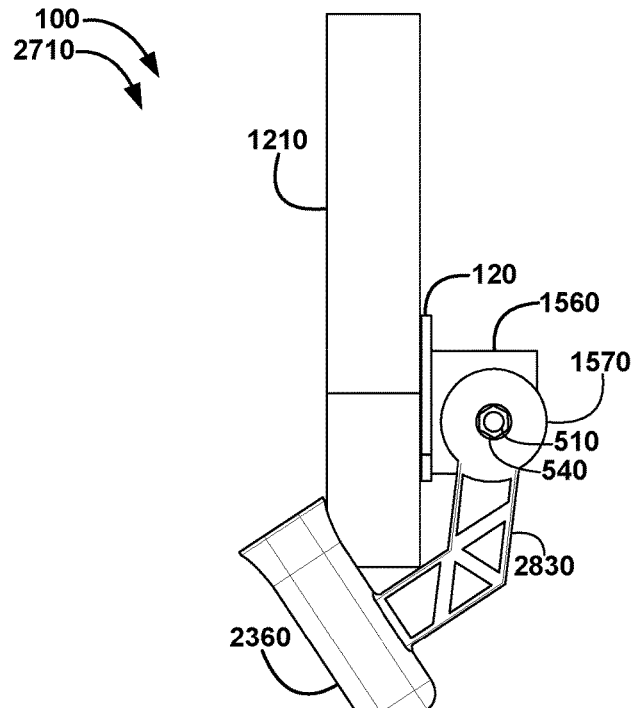
FIG. 29 shows a side view of Flag Mount Bracket System, mounted on the eaves, in the "loaded" position, according to the preferred embodiment of FIG. 28.

FIG. 28 shows a side view of Flag Mount Bracket System, showing the flag-arm portion 2830 of flag-mount bracket 2710 mounted to the underside of an eave 1210 according to an alternately preferred embodiment of the present invention. Many of the features of flag-mount bracket 2710 are repeated from flag-mount bracket 1310, as shown. Flag-mount bracket 2710 preferably comprises at least one bracket-mount portion 120 and at least one flag-arm portion 2830, as shown. However, flag-arm portion 2830 differs from flag-arm portion 130, in that it preferably comprises an "angled" or "wide V" configuration, as opposed to the longer and more cumbersome "U" configuration of the embodiment depicted in FIG. 13, as shown. This allows flag-mount bracket 2810 to be mounted on the inside of the eaves 1210 of a structure in a less conspicuous manner. FIG. 28 depicts flag-mount bracket 2810 of flag-mount bracket system 100 in the "loading" position, according to the preferred embodiment of FIG. 27. FIG. 29 shows a side view of Flag Mount Bracket 2810 of flag-mount bracket System 100, mounted on the eaves, in the "loaded" position, according to the preferred embodiment of FIG. 28, as shown.

Figures 30, 31:
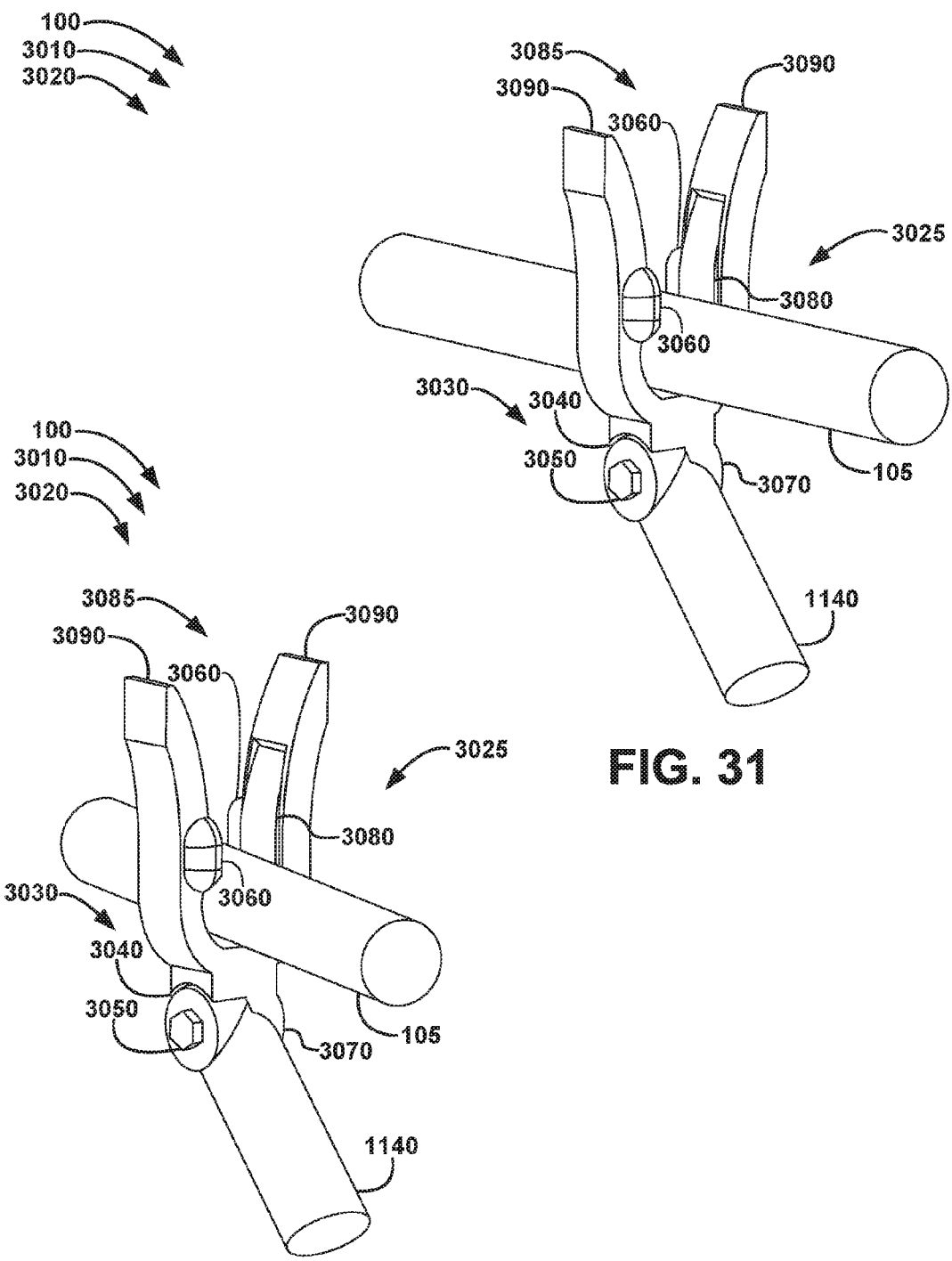
FIG. 30 shows a partial side perspective view of flag-mount-posting pole, with a specially designed "grabber-claw", according to an alternately preferred embodiment of the present invention.
FIG. 31 shows a partial side perspective view of flag-mount-posting pole, with the "grabber-claw" slightly twisted away from perpendicular to the flag pole to engage the flag-pole-lowering locks, according to the preferred embodiment of FIG. 30.

FIG. 30 shows a partial side perspective view of flag-mount-posting pole 3010 (at least embodying herein at least one flag-pole manipulator structured and arranged to permit user manipulation of such at least one flag pole; and at least embodying herein a flag-pole manipulator comprising a handle and a flag-pole engager; wherein said flag-pole engager comprises a base, two sides, a channel between said two sides). Flag-mount-posting pole 3010 preferably comprises the same flag-mount-posting pole 1110, which preferably comprises at least one pole, preferably at least one telescoping pole 1140. The details of the structure and assembly of telescoping pole 1140 is not provided here, since one of ordinary skill in the art, upon reading this specification, will appreciate how the present embodiments may be used in conjunction with such structure and assembly. Flag-mount-posting pole 3010 preferably differs from flag-mount-posting pole 1110 in that it comprises a specially designed grabber-claw 3020 which engages with flag pole 105 (at least herein embodying wherein said at least one flag-pole manipulator comprises at least one flag-pole engager structured and arranged to engage such at least one flag pole), according to an alternately preferred embodiment of the present invention. Grabber-claw 3020 preferably comprises a shape, preferably a "crab claw" type shape, which preferably comprises a U-shaped channel 3085 and at least one claw-arm 3090, preferably at least two claw-arms 3090 (at least herein embodying wherein said at least one flag-pole engager comprises at least one opening structured and arranged to allow lateral insertion of such at least one flag pole into said at least one flag-pole engager) on either side of U-shaped channel 3085, as shown. Each claw-arm 3090 is flared at the end allowing for ease of sliding grabber-claw 3020 around flag pole 105 and dual-flag-support gusset 2460 (described below). Grabber-claw 3020 preferably further comprises pole-attacher end 3030. Pole-attacher end 3030 preferably comprises articulated-joint attacher 3040. Articulated-joint attacher 3040 preferably attaches to flag-mount-posting pole 1140 with fastener 510, preferably bolt 3050. Bolt 3050 preferably acts an articulated joint, allowing claw arm 3090 to articulate to any desired angle at the end of flag-mount-posting pole 1140, as shown. Bolt 3050 is preferably placed through a hole at the end of pole 1140 and attachment-extension 3070 of grabber-claw 3020, as shown. A user can set the grabber-claw 3020 at any desired angle at the end of flag-mount-posting pole 1140, as shown.

Grabber-claw 3020 preferably comprises at least one flag-pole lock 3025 (at least herein embodying wherein said at least one flag-pole engager comprises at least one occluding geometry structured and arranged to at least partially occlude said at least one opening through altering the orientation of said at least one flag-pole engager with respect to such at least one flag pole; and at least herein embodying wherein said at least one occluding geometry comprises at least one protrusion structured and arranged to protrude from at least one side of said at least one flag-pole engager; and at least embodying herein a first protrusion protruding from a first side of said two sides, a second protrusion protruding from a second side of said two sides; wherein said first protrusion and said second protrusion protrude parallel to said channel and opposite from each other), as shown. Flag-pole lock 3025 preferably comprises at least one flag-securing bump 3060, preferably two flag-securing bumps 3060 which are ovular protrusions located on opposite sides of the claw-arms 3090 of grabber-claw 3020 (at least herein embodying wherein said at least one flag-pole engager comprises three sides, at least one opening being a fourth side; wherein said three sides bound by a channel in which such at least one flag pole can be laterally inserted through said at least one opening; and wherein said at least one protrusion protrudes parallel to said channel along at least one side of said three sides; wherein said at least one flag-pole engager is twisted where such at least one flag pole is askew in said channel, said at least one protrusion position over such at least one flag pole restricting the lateral movement of such at least one flag pole), as shown. Flag-pole lock 3025 preferably further comprises at least one claw-pole gripper 3080, as shown. Claw-pole gripper 3080 preferably comprises friction-gripping pad 3082 on the inside surface of U-shaped channel 3085 which, in conjunction with flag-securing bumps 3060, allows the grabber-claw 3020 to securely grip flag pole 105 when engaged with flag pole 105 in the locked orientation.

FIG. 31 shows a partial side perspective view of flag-mount-posting pole 3010, with grabber-claw 3020 slightly twisted away from perpendicular to flag pole 105 (at least herein embodying wherein when a flag pole is positioned in said channel and said flag-pole engager is twisted, the flag pole is locked into said channel, having three sides of flag pole touching said base and said two sides and having the fourth side engaged by both said first protrusion and said second protrusion) to engage flag-pole locks 3025, according to the preferred embodiment of FIG. 30.

When a user wants to lower a flag 107 mounted within flag-mount-bracket 2310 of flag-mount bracket system 100, the user must first "telescope" flag-mount-posting pole 3010 to an appropriate length which allows the user to reach flag 107 (or engage flag 107 for lowering), while standing on the ground. The user will then slide grabber-claw 3020 of flag-mount-posting pole 3010 over flag pole 105 (see FIG. 30). Once flag pole 105 is seated within grabber-claw 3020, the user will "twist" or turn flag-mount-posting pole 3010 slightly (about 10 degrees) clockwise, as shown. This "twisting" or turning of flag-mount-posting pole 3010 around flag pole 105 will cause both flag-securing bumps 3060 to each slide over flag pole 105; it will also cause each claw-pole gripper 3080 to tightly engage flag pole 105, essentially locking flag pole 105 securely within grabber-claw 3020, as shown. Once flag-pole 105 is securely locked within grabber-claw 3020, the user can then push slightly upward on flag pole 105, while maintaining the "twisted" position of flag-mount posting pole 3010 to maintain grabber-claw 3020 in the locked position around flag-mount posting pole 3010, to disengage pawls 1520 from their "locked" position. This will then allow the user to pull flag pole 105 downward, in a controlled manner, to the loading position A, where flag 107 can then be removed from flag-mount bracket 2310.

When a user wants to lower flags 107 mounted within flag-mount bracket 2410 of flag-mount bracket system 100, the user must first "telescope" flag-mount-posting pole 3010 to an appropriate length which allows the user to reach flags 107, while standing on the ground. The user will then slide grabber-claw 3020 of flag-mount-posting pole 3010 over one of the two flag poles 105 (see FIG. 30). Once flag pole 105 is seated within grabber-claw 3020, the user will "twist" or turn flag-mount-posting pole 3010 slightly (about 10 degrees) clockwise, as shown. This "twisting" or turning of flag-mount-posting pole 3010 around flag pole 105 will cause both flag-securing bumps 3060 to each slide over flag pole 105; it will also cause each claw-pole gripper 3080 to tightly engage flag pole 105, essentially locking flag pole 105 securely within grabber-claw 3020, as shown. Once flag-pole 105 is securely locked within grabber-claw 3020, the user can then push slightly upward on flag pole 105, while maintaining the "twisted" position of flag-mount posting pole 3010 to maintain grabber-claw 3020 in the locked position around flag pole 105, to disengage pawls 1520 from their "locked" position. This will then allow the user to pull flag pole 105 of flag-mount bracket 2410 downward. However, when lowering two flags 107, it is more difficult to control the lowering motion, especially if the flags 107 are large flags. Therefore, when lowering flags 107 posted in the dual flag-mount bracket 2410, the user will carefully lower the flags 107 with the flag-mount posting pole 3010 locked onto one of the flag poles 105 only to a point at which the user can reach the flag pole 105. Once the flag pole 105 is within hand reach of the user, the user can, while holding onto one of the flag poles 105, disengage flag-mount posting pole 3010 from flag pole 105 by "twisting" flag-mount posting pole back counter-clockwise. The user will then slide the claw-arms 3090 of grabber-claw 3020 of flag-mount posting pole 3010 over the flag-lowering-stabilization groove 2460 of dual-flag-support gusset 2450 of flag-mount bracket 2410, until "U-shaped" channel 3085 is completely seated within lowering-stabilization groove 2460. Now with the two flag poles 105 stably held, the user can lower flag-mount bracket 2410, the remainder of the distance to the "loading" position, safely and remove flag-securing adapter 2490 from flag-mount bracket 2410 to remove both flags 107.

When the user is raising flag 107 or flags 107, once flag pole 105 is securely "locked" into grabber-claw 3020, the user can then push upward on flag pole 105 (clicking past each lock position) until the desired flying angle is reached. In each case, the user then simply "twists" or turns flag-mount-posting pole 3010 back the about 10 degrees counter-clockwise to disengage flag-pole lock 3025 and remove grabber-claw from flag pole 105.

FIG. 32 shows a perspective view of flag-securing-sheath adapter 3220 of flag-mount bracket 2310 according to an alternately preferred embodiment of the present invention. Many of the features of flag-securing-sheath adapter 3220 are repeated from flag-securing-sheath adapter 2390, as shown. However, applicant has noted that some manufacturers offer flag poles 105 which are larger, up to about 1¼ inches, which would not be able to be accommodated by flag-securing-sheath adapter 2390, due to the fact that a pole of this size would not be able to seat all the way into flag-securing-sheath adapter 2390. Therefore, in the present embodiment, flag-securing-sheath adapter 3220 preferably comprises an added feature of sheath-adapter-extension arm 3230, as shown. Sheath-adapter-extension arm 3230 preferably comprises a cylindrical pole which is permanently seated down inside flag-securing-sheath adapter 2390 through the opening of adapter-flag receiver 2320 and extends out above the end of flag-securing-sheath adapter 2390 a length B of about 4 inches, thereby creating flag-securing-sheath adapter 3220, as shown. Sheath-adapter-extension arm 3230 being preferably seated inside flag-securing-sheath adapter 3220, allows for a larger cylindrical flag pole 105 of greater than 1 inch, to slide over sheath-adapter-extension arm 3230. The larger flag pole 105 then seats into the flared section 3240 of flag-securing-sheath adapter 3220. Flag pole 105 is then secured into flag-securing-sheath adapter 3220 with fastener 294, while having the added support of sheath-adapter-extension arm 3230 to accommodate the extra weight and size of the larger flag pole 105.

FIG. 33 shows a perspective view of flag-securing-sheath adapter 3310 according to an alternately preferred embodiment of the present invention. Many of the features of flag-securing-sheath adapter 3310 are repeated from flag-securing-sheath adapter 2490, as shown. However, flag-securing-sheath adapter 3310 preferably comprises adapter-flag receiver 3320. Adapter-flag receiver 3320 preferably comprises a diameter which is larger than that of adapter-flag-receiver 2320 of flag-securing-sheath adapter 2390 of flag-mount bracket 2310. Additionally, flag-securing-sheath adapter 3310 preferably comprises at least one, preferably at least two sheath-adapter arms 3330, which allow for a user to fly two flags at the same time using one flag-mount bracket system 100. Each sheath-adapter arm 3330 preferably comprises larger diameter openings to accommodate larger diameter flag poles 105 (of about 1¼ inches).

Although applicant has described applicant's preferred embodiments of this invention, it will be understood that the broadest scope of this invention includes modifications such as diverse shapes, sizes, and materials, as well as, non-conflicting combinations of features of various embodiments disclosed herein. Such scope is limited only by the below claims as read in connection with the above specification. Further, many other advantages of applicant's invention will be apparent to those skilled in the art from the above descriptions and the below claims.

What is claimed is:

1. A system, related to mounting multiple flag poles, comprising:
    a) at least one flag pole mount;
    b) at least one flag pole coupler structured and arranged to couple such at least one flag pole to said at least one flag pole mount;
    c) wherein said at least one flag pole coupler comprises two interlocking parts comprising:
        i) at least one flag pole portion structured and arranged to attach to such at least one flag pole, and
        ii) at least one mount receiver portion structured and arranged to receive said at least one flag pole portion on said at least one flag pole mount;
    d) wherein said at least one flag pole mount comprises:
        i) at least one surface mount structured and arranged to mount onto a substantially vertical surface, and
        ii) said at least one mount receiver portion;
    e) wherein said at least one flag pole coupler engages through insertion of said at least one flag pole portion into said at least one mount receiver portion;
    f) wherein said at least one flag pole coupler comprises at least one rotation restricting geometry structured and arranged to restrict rotation of said at least one flag pole portion about a longitudinal axis inside said at least one mount receiver portion.

2. The system according to claim 1 wherein said at least one flag pole portion comprises at least two flag pole receivers each structured and arranged to receive such at least one flag pole simultaneously.

3. The system according to claim 2:
    a) wherein said at least one rotation restricting geometry comprises a cross-section perpendicular to a longitudinal axis; and
    b) wherein said cross-section comprises at least one deviation from round.

4. The system according to claim 1:
    a) wherein said at least one rotation restricting geometry comprises a cross-section perpendicular to a longitudinal axis; and
    b) wherein said cross-section comprises at least one deviation from round.

5. The system according to claim 4 wherein said at least one rotation restricting geometry comprises a squared cross-section.

6. The system according to claim 1 wherein said at least one flag pole mount comprises:
    a) at least one surface mount structured and arranged to mount on at least one substantially vertical surface;
    b) at least one rotational hinge joint structured and arranged to hingedly joint said at least one surface mount and said at least one mount receiver portion;
    c) wherein said at least one rotational hinge joint
        i) permits rotation of said at least one mount receiver portion of at least 90 degrees with respect to said at least one surface mount, and
        ii) comprises at least three positions of said at least one mount receiver portion that can be maintained by said at least one rotational hinge joint, and
        iii) comprises at least one position releaser structured and arranged to release a maintained position through the application of a tangential force applied to said at least one rotational hinge joint through said at least one mount receiver portion.

7. The system according to claim 6:
    a) wherein said at least three positions comprise
        i) a full-mast raised position of the at least one flag,
        ii) a half-mast raised position of the at least one flag, and
        iii) a lowered position of the at least one flag; and
    b) wherein said rotation of said at least one rotational hinge joint comprises a unidirectional rotation from said lowered position, through said half-mast raised position and through said full-mast raised position, and comprises an opposite unidirectional rotation from past said full-mast raised position to said lowered position; and
    c) wherein rotation past said full-mast raised position reverses directionality of rotation.

8. The system according to claim 6 wherein said at least three positions comprise 15 degree intervals.

9. The system according to claim 6 further comprising at least one flag-pole manipulator structured and arranged to permit user-manipulation of such at least one flag pole.

10. The system according to claim 9:
    a) wherein said at least one flag-pole manipulator comprises at least one flag-pole engager structured and arranged to engage such at least one flag pole;
    b) wherein said at least one flag-pole engager comprises
        i) at least one opening structured and arranged to allow lateral insertion of such at least one flag pole into said at least one flag-pole engager, ii) at least one occluding geometry structured and arranged to at least partially occlude said at least one opening through altering the orientation of said at least one flag-pole engager with respect to such at least one flag pole.

11. The system according to claim 10 wherein said at least one occluding geometry comprises at least one protrusion structured and arranged to protrude from at least one side of said at least one flag-pole engager.

12. The system according to claim 11:
a) wherein said at least one flag-pole engager comprises three sides, said at least one opening being a forth side;
b) wherein said three sides bound a channel in which such at least one flag pole can be laterally inserted through said at least one opening; and
c) wherein said at least one protrusion protrudes parallel to said channel along at least one side of said three sides;
d) wherein, when said at least one flag-pole engager is twisted where such at least one flag pole is askew in said channel, said at least one protrusion positions over such at least one flag pole restricting the lateral movement of such at least one flag pole.

13. The system according to claim 12 wherein said at least one flag pole portion comprises at least two flag pole receivers each structured and arranged to receive such at least one flag pole simultaneously.

14. The system according to claim 13 wherein said at least one rotation restricting geometry comprises a cross-section comprising at least one deviation from round.

15. The system according to claim 1 further comprising at least one eaves-retractor structured and arranged to retract said at least one flag-pole receiver under at least one roof eaves when in such lowered position.

16. A system, relating to coupling two flag poles to a single flag pole mount, comprising:
a) a flag-pole mount;
b) a coupler structured and arranged to couple two flag poles to said flag-pole mount;
c) wherein said flag-pole mount comprises
i) at least one surface mount structured and arranged to mount onto a substantially vertical surface,
ii) a receiver structured and arranged to receive said coupler, and
iii) a hinged joint structured and arranged to hingedly join said receiver to said flag-pole mount;
d) wherein said coupler linearly inserts into said receiver, and couples and decouples with said receiver using a force, upon said coupler, linear to the direction of insertion;
e) wherein said coupler and said receiver comprise a spin restricting geometry structured and arranged to restrict spinning of said coupler in said receiver.

17. The system according to claim 16:
a) wherein said hinged joint comprises a directional ratchet allowing unidirectional rotation until reaching a maximum rotation where the direction of allowed rotation is reversed;
b) wherein said hinged joint comprises at least two positions that are maintained by said hinged joint against gravity.

18. The system according to claim 17 further comprising:
a) a flag-pole manipulator comprising
i) a handle and
ii) a flag-pole engager;
b) wherein said flag-pole engager comprises
i) a base,
ii) two sides,
iii) a channel between said two sides, and
iv) a first protrusion protruding from a first side of said two sides
v) a second protrusion protruding from a second side of said two sides
vi) wherein said first protrusion and said second protrusion protrude parallel to said channel and opposite from each other
vii) wherein when a flag pole is positioned in said channel and said flag-pole engager is twisted the flag pole is locked into said channel, having three sides of flag pole touching said base and said two sides and having the forth side engaged by both said first protrusion and said second protrusion.

19. The system according to claim 16:
a) wherein said spin restricting geometry comprises a cross-section perpendicular to a longitudinal axis; and
b) wherein said cross-section comprises at least one deviation from round.

20. The system according to claim 19 wherein said spin restricting geometry comprises a squared cross-section.

* * * * *